US012383113B2

(12) United States Patent
Lee et al.

(10) Patent No.: US 12,383,113 B2
(45) Date of Patent: Aug. 12, 2025

(54) AUXILIARY GRAY WATER SOURCE DEVICE FOR COMMERCIAL KITCHENS

(71) Applicant: Seven Hour Drive, LLC, Irvine, CA (US)

(72) Inventors: Eduardo Yong Lee, Irvine, CA (US); Daniel John Dickenson, Laguna Niguel, CA (US)

(73) Assignee: Seven Hour Drive, LLC, Irvine, CA (US)

( * ) Notice: Subject to any disclaimer, the term of this patent is extended or adjusted under 35 U.S.C. 154(b) by 0 days.

(21) Appl. No.: 17/663,746

(22) Filed: May 17, 2022

(65) Prior Publication Data

US 2023/0074654 A1 Mar. 9, 2023

Related U.S. Application Data

(63) Continuation of application No. 16/921,769, filed on Jul. 6, 2020, now Pat. No. 11,330,960, which is a continuation of application No. 16/164,662, filed on Oct. 18, 2018, now Pat. No. 10,702,124, which is a continuation of application No. 15/448,486, filed on
(Continued)

(51) Int. Cl.
| | |
|---|---|
| *A47L 15/42* | (2006.01) |
| *A47L 15/00* | (2006.01) |
| *C02F 1/00* | (2023.01) |
| *C02F 1/76* | (2023.01) |

(Continued)

(52) U.S. Cl.
CPC ....... *A47L 15/4291* (2013.01); *A47L 15/0076* (2013.01); *A47L 15/4206* (2013.01); *A47L 15/4217* (2013.01); *C02F 1/001* (2013.01); *A47L 2501/01* (2013.01); *A47L 2501/04* (2013.01); *A47L 2501/07* (2013.01); *C02F 1/76* (2013.01); *C02F 2103/002* (2013.01);
(Continued)

(58) Field of Classification Search
None
See application file for complete search history.

(56) References Cited

U.S. PATENT DOCUMENTS

| | | | |
|---|---|---|---|
| 1,833,374 | A | 11/1931 | Renshaw |
| 1,980,065 | A | 11/1934 | Johnston |
| (Continued) | | | |

FOREIGN PATENT DOCUMENTS

| | | | |
|---|---|---|---|
| CA | 2626171 A1 | 9/2009 | |
| DE | 4330395 A1 | 3/1995 | |
| (Continued) | | | |

OTHER PUBLICATIONS

Wexiodisk, "The Hood Type Concept", 2013, www.wexiodisk.com, in 8 pages.
(Continued)

Primary Examiner — Angelisa L. Hicks
(74) Attorney, Agent, or Firm — Knobbe, Martens, Olson & Bear, LLP

(57) ABSTRACT

An auxiliary gray water supply device captures used wash water from a commercial warewashing machine for supply to a pre-rinse station without substantial modification of the commercial warewashing machine. The captured wash water and treatment agent are delivered to a pre-rinse station for pre-rinsing of dishes that will be washed within the commercial warewashing machine.

16 Claims, 10 Drawing Sheets

Related U.S. Application Data

Mar. 2, 2017, now Pat. No. 10,105,033, which is a continuation-in-part of application No. PCT/US2015/051551, filed on Sep. 22, 2015, which is a continuation-in-part of application No. 14/493,808, filed on Sep. 23, 2014, now Pat. No. 9,596,973, said application No. 15/448,486 is a continuation-in-part of application No. 14/493,808, filed on Sep. 23, 2014, now Pat. No. 9,596,973, which is a continuation-in-part of application No. 14/211,332, filed on Mar. 14, 2014, now abandoned, which is a continuation-in-part of application No. 13/815,995, filed on Mar. 21, 2013, now abandoned.

(60) Provisional application No. 62/365,315, filed on Jul. 21, 2016.

(51) Int. Cl.
*C02F 103/00* (2006.01)
*C02F 103/32* (2006.01)

(52) U.S. Cl.
CPC ...... *C02F 2103/32* (2013.01); *C02F 2307/12* (2013.01); *Y10T 29/49826* (2015.01)

(56) References Cited

U.S. PATENT DOCUMENTS

| | | | |
|---|---|---|---|
| 2,501,260 A | | 3/1950 | Arivd |
| 2,963,029 A | | 12/1960 | Bock |
| 3,108,606 A | | 10/1963 | Grunvogel |
| 3,949,772 A | | 4/1976 | Hartmann |
| 4,064,836 A | | 12/1977 | Taborsky |
| 4,134,833 A | | 1/1979 | McCormick |
| 4,228,813 A | * | 10/1980 | Noren ............... A47L 15/241 134/104.1 |
| 4,317,720 A | | 3/1982 | Hawk |
| 4,439,242 A | | 3/1984 | Hadden |
| 4,529,032 A | | 7/1985 | Molitor |
| 4,615,744 A | | 10/1986 | Murtha |
| 4,776,359 A | | 10/1988 | Federighi et al. |
| 4,816,148 A | | 3/1989 | Hemman |
| 5,100,540 A | | 3/1992 | Ramirez et al. |
| 5,247,876 A | * | 9/1993 | Wilson ............... B01D 29/54 210/DIG. 8 |
| 5,251,346 A | | 10/1993 | Donati |
| 5,542,983 A | | 8/1996 | Hamilton et al. |
| 5,573,677 A | | 11/1996 | Dembrosky |
| 5,617,885 A | | 4/1997 | Centis |
| 5,660,193 A | | 8/1997 | Archer et al. |
| 5,759,387 A | | 6/1998 | Wilkes |
| 6,199,565 B1 | * | 3/2001 | Bluestone ............ B08B 3/006 134/201 |
| 6,702,942 B1 | | 3/2004 | Nield |
| 6,712,082 B2 | | 3/2004 | Crane et al. |
| 7,179,376 B2 | | 2/2007 | Kaleem et al. |
| 7,666,265 B2 | | 2/2010 | Yoon et al. |
| 7,892,359 B2 | | 2/2011 | Berner et al. |
| 7,954,913 B2 | | 6/2011 | Gunnerson et al. |
| 9,596,973 B2 | | 3/2017 | Lee et al. |
| 10,105,033 B2 | | 10/2018 | Lee et al. |
| 10,702,124 B2 | | 7/2020 | Lee et al. |
| 11,330,960 B2 | | 5/2022 | Lee et al. |

| | | |
|---|---|---|
| 2002/0170584 A1 | 11/2002 | Crane et al. |
| 2003/0213704 A1 | 11/2003 | Scheper et al. |
| 2005/0103717 A1 | 5/2005 | Jha et al. |
| 2005/0211277 A1 | 9/2005 | Fransson |
| 2007/0023069 A1 | 2/2007 | Berner et al. |
| 2007/0034240 A1 | 2/2007 | Berner et al. |
| 2008/0116135 A1 | 5/2008 | Rieger et al. |
| 2008/0164190 A1 | 7/2008 | Pezzaniti et al. |
| 2009/0211611 A1 | 8/2009 | Berner et al. |
| 2010/0071725 A1 | 3/2010 | Peukert et al. |
| 2011/0067732 A1 | 3/2011 | Smith et al. |
| 2011/0088791 A1 | 4/2011 | Primm, Jr. |
| 2011/0132407 A1 | 6/2011 | Fauth et al. |
| 2011/0155179 A1 | 6/2011 | Delle et al. |
| 2011/0232690 A1 | 9/2011 | Ericsson et al. |
| 2012/0012196 A1 | 1/2012 | Gallo et al. |
| 2012/0125443 A1 | 5/2012 | Borg et al. |
| 2013/0019974 A1 | 1/2013 | Laera |
| 2013/0056039 A1 | 3/2013 | Hartz |
| 2014/0224238 A1 | 8/2014 | Moulton |
| 2014/0283927 A1 | 9/2014 | Lee et al. |
| 2014/0283934 A1 | 9/2014 | Lee et al. |

FOREIGN PATENT DOCUMENTS

| | | | | |
|---|---|---|---|---|
| DE | 10046347 A1 | 3/2002 | | |
| EP | 1683904 A1 | 7/2006 | | |
| EP | 2072000 A1 | 6/2009 | | |
| JP | 2004298867 A | * | 10/2004 | ......... A47L 15/4291 |
| WO | WO 2010/040969 A1 | 4/2010 | | |
| WO | WO 2014/153475 A2 | 9/2014 | | |
| WO | WO 2016/049083 A1 | 3/2016 | | |

OTHER PUBLICATIONS

Parker Hannafin, Glass-MateTM Cartridges, 2007, http://www.parker.com/literature/Process%20Advanced%20Filtration%20Division/PAFD_literature/Single%20sheets/GlassMate%20C2041.pdf; 3 pages.

International Search Report and Written Opinion in corresponding International Patent Application No. PCT/US14/31368, dated Sep. 9, 2014, in 8 pages.

International Preliminary Report on Patentability in corresponding International Patent Application No. PCT/US14/31368, dated Oct. 1, 2015, in 7 pages.

International Search Report and Written Opinion in corresponding International Patent Application No. PCT/US2015/051551, dated Dec. 29, 2015, in 7 pages.

International Preliminary Report on Patentability in corresponding International Patent Application No. PCT/US2015/051551, dated Apr. 6, 2017, in 6 pages.

Office Action in corresponding Canadian Patent Application No. 2907689, dated Aug. 5, 2020, in 4 pages.

Partial Supplementary Search Report in corresponding European Patent Application No. 14769609.0, dated Jul. 7, 2016, in 7 pages.

Extended Search Report in corresponding European Patent Application No. 14769609.0, dated Nov. 25, 2016, in 15 pages.

Office Action in corresponding European Patent Application No. 14769609.0, dated Sep. 13, 2019, in 6 pages.

Office Action in corresponding Mexican Patent Application No. MX/a/2015/013327, dated Oct. 25, 2019, in 4 pages.

Office Action in corresponding European Patent Application No. 14769609.0, dated Feb. 18, 2022, in 5 pages.

* cited by examiner

AUXILIARY GRAY WATER SOURCE DEVICE FOR COMMERCIAL KITCHENS

CROSS REFERENCE

This application is a continuation of U.S. application Ser. No. 16/921,769, filed Jul. 6, 2020, now U.S. Pat. No. 11,330,960, which is a continuation of U.S. application Ser. No. 16/164,662, filed Oct. 18, 2018, which is a continuation of U.S. application Ser. No. 15/448,486, filed Mar. 2, 2017 (the '486 Application). The '486 Application claims the benefit under at least 35 U.S.C. § 119 of U.S. Provisional Application No. 62/365,315, filed Jul. 21, 2016.

In addition, the '486 application claims the benefit under at least 35 U.S.C. §§ 120 and 365(c) as a continuation-in-part of International Application No. PCT/US2015/051551, designating the United States, with an international filing date of Sep. 22, 2015, which claims the benefit under at least 35 U.S.C. § 120 as a continuation-in-part of U.S. application Ser. No. 14/493,808, filed Sep. 23, 2014, which is a continuation-in-part of U.S. application Ser. No. 14/211,332, filed Mar. 14, 2014, which is a continuation-in-part application of U.S. application Ser. No. 13/815,995, filed Mar. 21, 2013.

Furthermore, the '486 application claims the benefit under at least 35 U.S.C. § 120 as a continuation-in-part of U.S. application Ser. No. 14/493,808, filed Sep. 23, 2014, which is a continuation-in-part of U.S. application Ser. No. 14/211,332, filed Mar. 14, 2014, which is a continuation-in-part application of U.S. application Ser. No. 13/815,995, filed Mar. 21, 2013.

The entirety of each of the aforementioned applications is incorporated by reference herein and made a part of this specification.

FIELD

The present disclosure generally relates to commercial warewashing facilities. More particularly, the present disclosure relates to an auxiliary apparatus designed to provide a replenishing gray water source for use by a pre-rinse station prior to a warewashing machine in such facilities.

BACKGROUND

The food service industry needs to manage the high number of soiled dishes encountered on a daily basis. The food service industry includes restaurants and numerous institutional food service establishments present in schools, prisons, municipal buildings, military mess halls, and the like.

In such food service industry establishments, the warewashing process typically begins with scraping of dishes into a garbage can or other refuse container. Scraping is performed to remove the larger scraps of food and the like. Following scraping, pre-rinse sprayers are used to rinse the dishes prior to placement of the dishes into commercial warewashing machines.

The commercial warewashing machine market is different that of most other commercial food service equipment markets. Warewashing machines often are not owned by the individual restaurant or food service operator. Rather, warewashing machines are leased to the individual restaurant or food service operator by a chemical sales company. As a term of many leases, the food establishment is not able to modify, service or repair the warewashing machine. Rather, the food establishment is simply able to use the machine to wash the dishes.

SUMMARY OF CERTAIN FEATURES

Commercial warewashing machines come in several different configurations. One of the configurations is a fill-and-dump machine. In such machines, the water is dumped after each wash. One example of such a machine is the ES2000 Dishmachine by EcoLab. In the ES2000 Dishmachine, between one and five gallons of used dishwashing water is dumped into a drain following each wash cycle. This dishwashing water comprises a plurality of soaps and rinsing agents.

One aspect of the present disclosure involves the recognition that it is desired to save both water and gas/electric while not significantly modifying a warewashing machine. Accordingly, certain features, aspects and advantages of the present disclosure provide for an auxiliary device that is separate of a commercial warewashing machine but that can capture some or all of the used dishwashing water for use with a pre-rinse station. In some configurations, the auxiliary device can capture the used dishwashing water without substantial modification of the commercial warewashing machine. In some configurations, the auxiliary device can be integrated into a commercial warewashing machine.

Certain features, aspects and advantages of the present disclosure provide for a method of installing an auxiliary device that is separate of a commercial warewashing machine but that can capture some or all of the used dishwashing water for use with a pre-rinsing station.

In accordance with certain features, aspects and advantages of the present disclosure, an auxiliary gray water supply device for use in a commercial food service facility is provided. The auxiliary gray water supply device comprises a tank. The tank comprises an inlet. The inlet receives a removable scrap trap. The tank further comprises an overflow outlet and a freshwater supply inlet. The overflow outlet is vertically lower than the freshwater supply inlet. A pump has an inlet in fluid communication with the tank and an outlet in fluid communication with a delivery conduit.

In accordance with certain features, aspects and advantages of the present disclosure, a method of installing an auxiliary gray water supply device is provided. The method comprising disconnecting a pre-rinse unit from a hot water faucet and a cold water faucet, locating the auxiliary gray water supply device proximate a warewashing station, connecting a delivery conduit to the hot water faucet and the cold water faucet and positioning an inlet of the auxiliary gray water supply device vertically below an outlet from a warewashing machine whereby a tank of the auxiliary gray water supply device captures substantially all of a load of gray water being evacuated from the warewashing machine through the inlet of the auxiliary gray water supply device without significant modification of the warewashing machine.

BRIEF DESCRIPTION OF THE DRAWINGS

Certain features, aspects and advantages of the present invention will now be described with reference to the drawings, which embodiment are intended to illustrate and not to limit the invention, and in which figures.

DETAILED DESCRIPTION OF CERTAIN EMBODIMENTS

Figure 1:
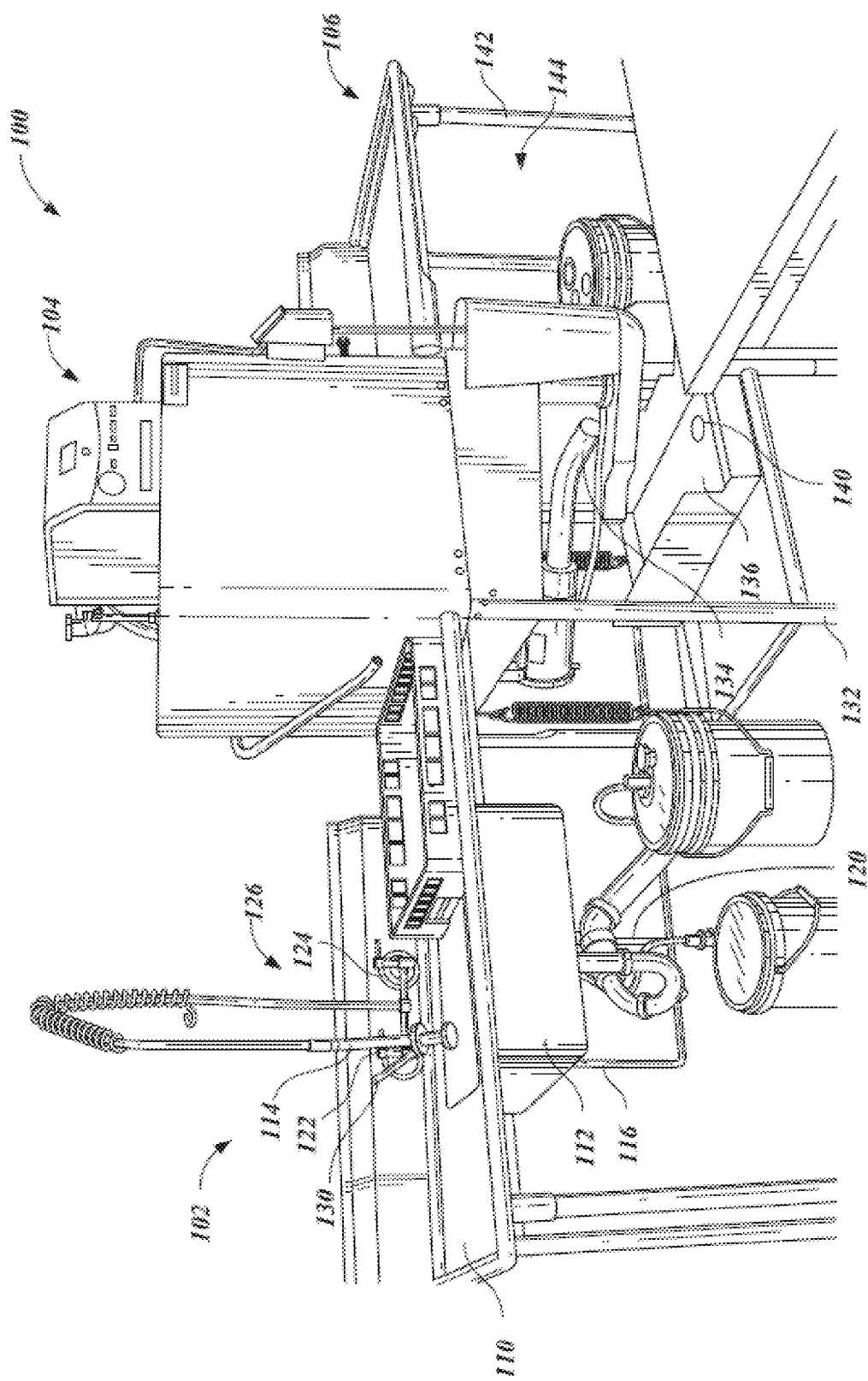
FIG. 1 is a perspective view of a typical commercial warewashing station.

With reference now to FIG. 1, a typical commercial warewashing station 100 will be introduced. The station 100 can include three main regions. The first region can include a pre-rinse station 102. Following the pre-rinse station 102 is a second region that includes a warewashing machine 104. The third region, which is downstream of the first and second regions, can include an air-drying table 106.

In the illustrated configuration, the station 100 is laid out in a straight-through configuration. In some configurations, the station 100 can be L-shaped or U-shaped. In some configurations, the station 100 has a counter depth of 24 inches. These differing configurations can result in variations of certain features, aspects and advantages of the present invention, as will be explained below. In other words, some of the components can be relocated to better facilitate access to those components, such as spigots, faucets, valves and scrap traps, for example but without limitation.

With continued reference to FIG. 1, the pre-rinse station 102 comprises a table 110. A sink 112 can be mounted to the table 110. A pre-rinse unit 114 can be positioned generally above the sink 112. The pre-rinse unit 114 can be connected to one or more of a hot water supply 116 and a cold water supply 120. The hot water supply 116 and the cold water supply 120 can comprise a hot water faucet 122 and a cold water faucet 124. Generally, the pre-rinse unit 114 will comprise an inlet 126 that will be connected to at least one of, and typically both of, the hot water faucet 122 and the cold water faucet 124. The pre-rinse unit 114 also can include a valve 130 to control the flow out of the pre-rinse unit 114. When the valve 130 is actuated, flow from the hot water supply 116 and the cold water supply 120 can pass through the hot water faucet 122 and the cold water faucet 124, through the pre-rinse unit 114 and into the sink 112. In most configurations, the pre-rinse station 102 will use a low flow nozzle or spray head due to various local water-use regulations.

The warewashing machine 104 can have any suitable configuration. In some configurations, the warewashing machine 104 can be a machine, such as the ES2000 by EcoLab. Because some embodiments involve providing an auxiliary device to the warewashing machine 104 without significant modification to the warewashing machine 104, many features of the warewashing machine 104 will not be described in detail.

The illustrated warewashing machine 104 is supported by a frame 132. Any suitable support or frame 132 can be used so long as access is available to an outlet 134 from the washing chamber (not shown). In the illustrated configuration, the outlet 134 is positioned generally above a scrap trap 136. The scrap trap 136 can comprise a perforated tray that serves to separate larger food waste and the like from water emitted through the outlet 134. Water that has passed through the scrap trap 136 flows through a drain outlet 140 that can be plumbed to the nearest floor sink or the like. The drain outlet 140 can be connected to the floor sink or the like using a conduit, for example but without limitation.

When the warewashing machine 104 is in use, the warewashing machine 104 is supplied fresh water and pre-rinsed dishes to wash as a batch. Upon completion of a wash cycle, the warewashing machine 104 dumps the used wash water (i.e., the gray water) through the outlet 134, onto the scrap trap 136 and ultimately through the drain outlet 140, which is plumbed to the city sewer system. The amount of gray water disposed can vary depending upon the make and model of the warewashing machine in use. In some configurations, the warewashing machine 104 can emit between one and five gallons per cycle.

The air-drying table 106 can have any suitable configuration. In some configurations, the air-drying table 106 includes a frame 142. The frame 142 can have an open configuration to define an open racking area 144. In some configurations, the frame 142 can be positioned above the floor sink, floor drain or the like.

Auxiliary Devices for the Capture of Gray Water

Figure 2:
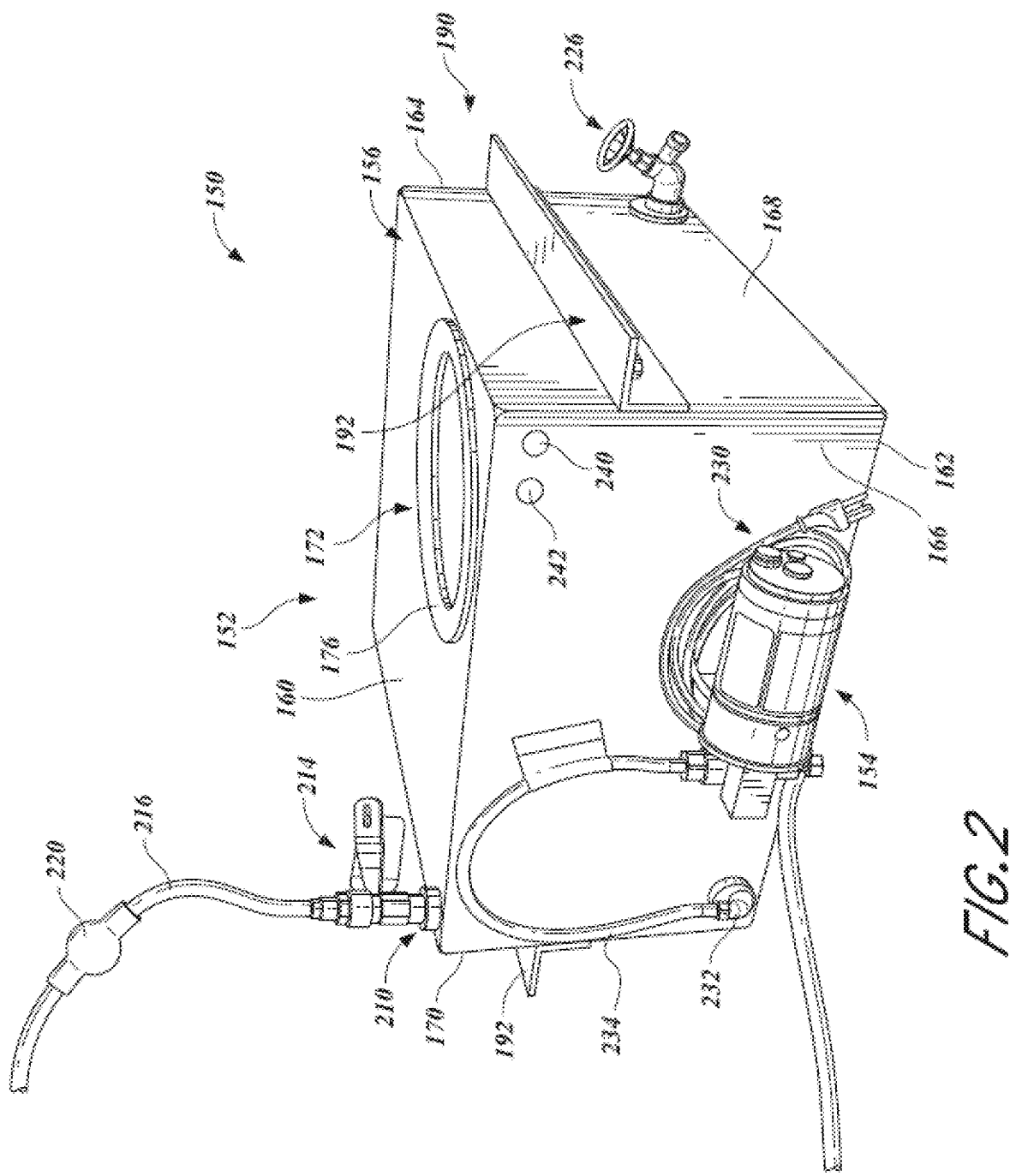
FIG. 2 is a perspective view of an auxiliary device that can be used with the commercial warewashing station of FIG. 1.
Figure 3:
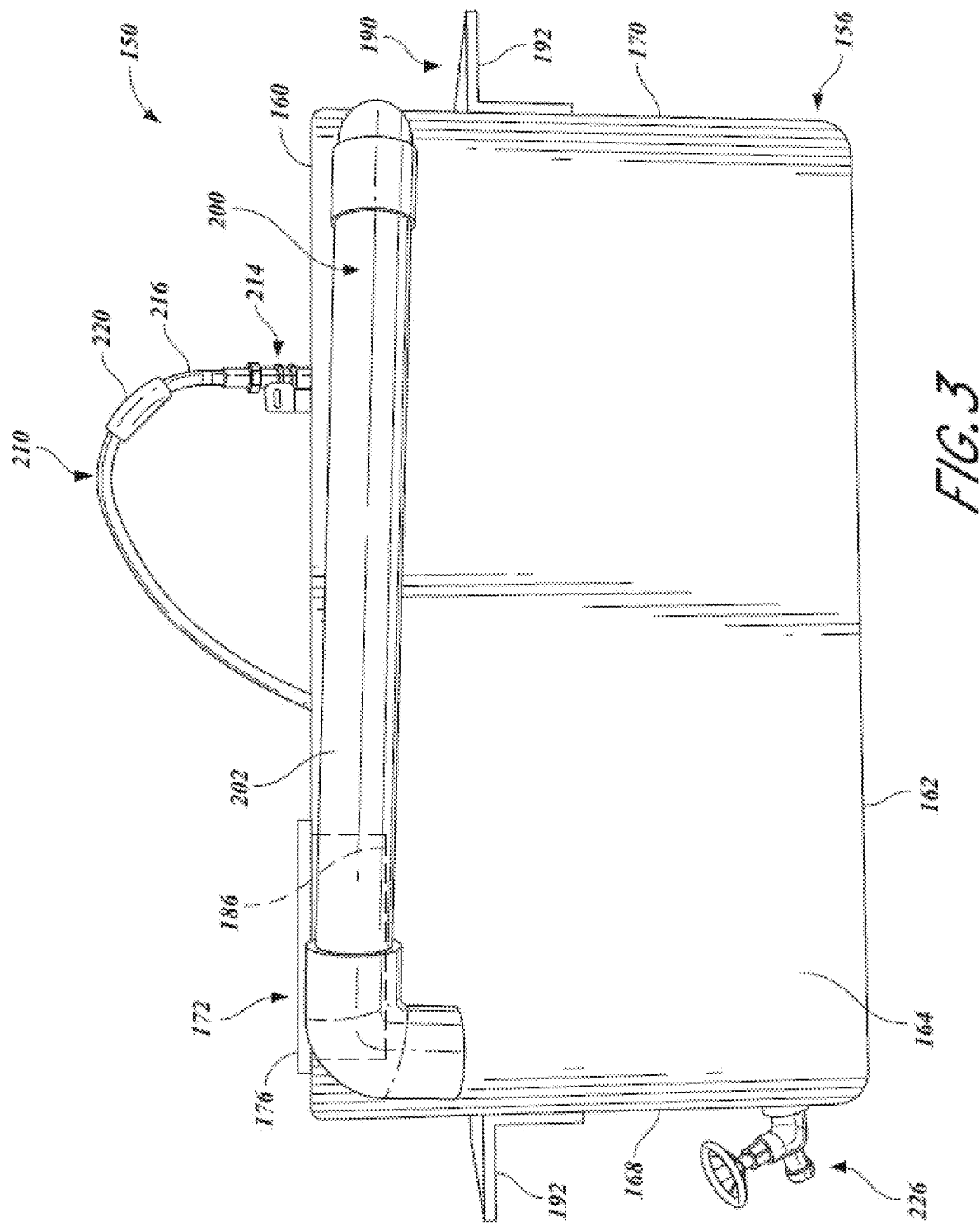
FIG. 3 is a rear view of the auxiliary device of FIG. 2.
Figure 5:
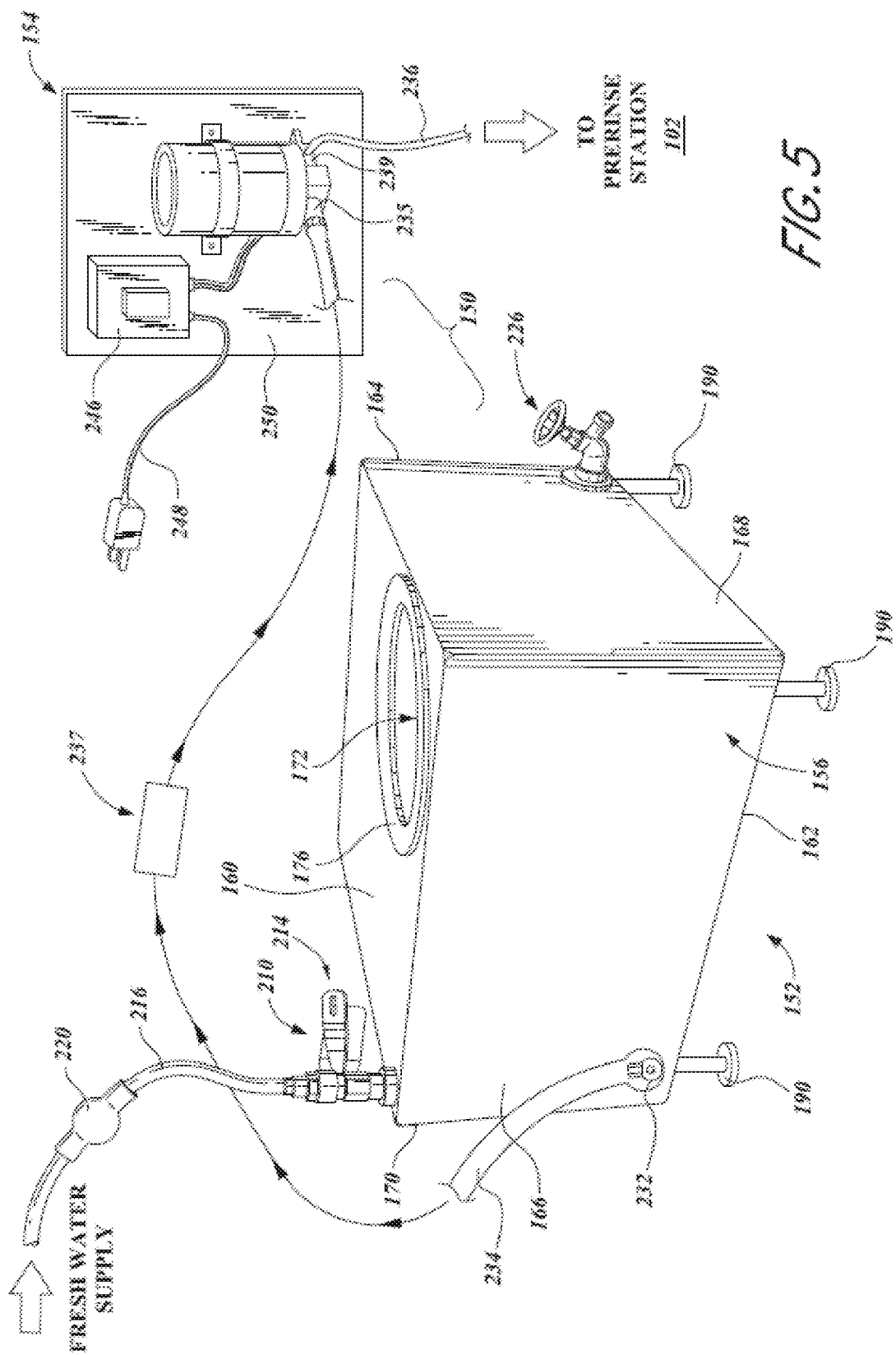
FIG. 5 is a perspective view of the auxiliary device of FIG. 2 with a holding portion and a transfer portion separated from each other.

An auxiliary device 150 that is arranged and configured in accordance with certain features, aspects and advantages of the present invention is shown in FIGS. 2, 3 and 5. The auxiliary device 150 captures the gray water being emitted from the warewashing machine 104. The auxiliary device 150 can supply the captured gray water to the pre-rinse station 102. The gray water captured by the auxiliary device 150 has been sanitized, softened and soaped during the wash cycle of the warewashing machine 104.

Advantageously, the auxiliary device 150 is separate of the warewashing machine 104 and is not permanently connected to the warewashing machine 104. While the illustrated configuration is separate of the warewashing machine 104 and not permanently connected to the warewashing machine 104, it is possible to integrate the auxiliary device 150 or at least some components of the auxiliary device 150 into a warewashing machine 104 to provide an improved warewashing machine 104. More advantageously, the auxiliary device 150 is adapted to be fluidly connected to the warewashing machine 104 through an air gap. For example, an air gap can be disposed between the water outlet of the warewashing machine 104 and the inlet into the auxiliary device 150. In some configurations, the air gap is defined between the outlet 134 and the inlet into the auxiliary device 150 with no physical components interposed there between. In some configurations, including the illustrated configuration, the air gap can be defined between the drain outlet 140 (or the outlet end of a conduit connected to the drain outlet 140) and the inlet into the auxiliary device 150 with no physical components interposed there between. In other words, the air gap preferably is positioned between the outlet and the inlet. The air gap can be more than about 2 times the effective inner diameter of the outlet pipe of the warewashing machine 104. In some configurations, the air gap can be between 2 and 3 times the effective inner diameter of the outlet pipe of the warewashing machine 104.

Broadly speaking, the auxiliary device 150 can include a holding portion 152 and transfer portion 154 that is in fluid communication with the holding portion 152. The holding portion 152 receives and collects the gray water. The transfer portion 154 conveys the gray water from the holding portion 152 to the pre-rinse station 102.

With reference now to FIG. 2, the holding portion 152 of the auxiliary device 150 generally comprises a tank 156. The tank 156 can be formed from any suitable materials keeping in mind that the tank will handle gray water that is at least about 115 degrees Fahrenheit. In some instances, the tank 156 will handle gray water that is between about 120 and 140 degrees Fahrenheit. Preferably, the tank 156 is formed of a material that can tolerate temperatures below about 190 degrees Fahrenheit (rinse water at temperatures of 194 degrees Fahrenheit and above is believed to simply cook food onto the surface of the dishes being washed).

In some configurations, the tank 156 can be formed of a material that is at least partially translucent. In some configurations, the tank 156 is formed of a material that is sufficiently translucent to provide visual confirmation of the contents of the tank 156. Moreover, the tank 156 preferably is formed of a material that admits light into the tank 156 to facilitate cleaning and drying of the tank 156 at the end of a day. The tank 156 can be formed of a material, such as polystyrene, that can provide easy formation of the tank 156. In some configurations, the tank 156 can be formed of a material that incorporates recycled materials, such as recycled plastic bottles, for example but without limitation.

Using a plastic material to form the tank 156 can provide insulating properties. In addition, the thickness of the walls can help insulate the tank 156. For example, as will be explained, a pump including a pump motor may be secured to the tank 156 and, therefore, forming the tank 156 of a plastic-based material will reduce motor vibrations and reduce or eliminate the need for an isolator or damper to be positioned between the tank 156 and the pump motor. In addition, as discussed above, the tank desirably can handle water having elevated temperatures and, therefore, being somewhat insulating is desired to help retain the heat in the gray water for use in pre-rinsing operations.

The tank 156 can have any suitable shape, size and configuration. Given a counter depth of about 24 inches, the tank preferably extends front to rear a total of less than the counter depth (i.e., 24 inches) but other dimensions are possible. In some configurations, the shape and sizing of the tank 156 is less important than the internal volume of the tank 156. For example, in some configurations, the tank 156 is designed to retain a full release of wash water from the warewashing machine 104 and the warewashing machine 104 releases about 1.4 gallons per cycle. Thus, in such configurations, the tank 156 is sized and configured to define an internal volume of at least about 1.4 gallons. Other warewashing machines can release more or less gallons per cycle (e.g., 2-3 gallons) and the size of the tank 156 can be determined based upon the application.

The outer dimensions of the tank 156 also can be determined based upon a desire to position the tank under one or more of the pre-rinse station 102, the warewashing machine 104 and the air-drying table 106. For instance, in applications in which the tank 156 will be positioned directly below the warewashing machine 104, the vertical height can be selected based upon the required height when the width and depth of the tank 156 are specified to fit within the frame 132 of the warewashing machine 104. Similarly, in applications in which the tank 156 will be positioned under the air-drying table 106, the width of the tank may be greater than the width when the tank 156 is designed to be placed below the warewashing machine 104 due to the difference in the configuration of the frame 142 of the air-drying table 106 relative to the frame 132 of the warewashing machine 104. As such, the height of the tank 156 may be reduced in such applications. In some configurations, the height of the tank is less than about 8 inches. In some configurations, the tank height is determined based upon the application. For example, the tank can have a height that is short enough to fit under a support bar of the warewashing machine 104 or the like.

The illustrated tank 156 comprises a top 160, a bottom 162, and at least one sidewall that extends generally between the top 160 and the bottom 162. In the illustrated configuration, the tank 156 includes a front wall 164, an opposing rear wall 166, a left wall 168 and an opposing right wall 170. To facilitate cleaning, the internal junctures of two or more walls, especially the junctures of the side walls 164, 166, 168, 170 with the bottom 162, are radiused to reduce the occurrence of tight corners that can be difficult to clean and/or dry.

With reference still to FIG. 2, a fine scrap trap 172 (also referred to as a screen) can be assembled to the tank 156. In some configurations, the fine scrap trap 172 defines a basket. As described above, the tank 156 captures water from the warewashing machine 104. While the warewashing machine 104 may include a scrap trap (e.g., scrap trap 136) of its own, the fine scrap trap 172 can be interposed between the drain outlet 140 of the warewashing machine 104 such that the gray water has already been filtered once or can be interposed between the outlet 134 of the warewashing machine 104 such that the fine scrap trap 172 performs as a primary scrap trap for the system. Because of the difference in the ultimate treatment of the gray water (i.e., from the drain outlet 140, the water goes to the city sewer system; from the tank 156, the water goes to the pre-rinse station 102), the fine scrap trap 172 advantageously is configured to limit or eliminate the infiltration of finer particles (e.g., tomato skins, rice, etc.) that could clog the pre-rinse station 102. In some applications, the fine scrap trap 172 incorporates a mesh (e.g., a stainless steel mesh). In some applications, the mesh has sufficiently small openings such that almost no rice can pass through the mesh intact.

In the illustrated configuration, the tank 156 includes an opening 174. The opening 174 can have any suitable size and configuration. In the illustrated configuration, the opening 174 is sized to be more than two times the inner effective diameter of the drain outlet 140 of the warewashing machine 104. The opening 174 receives the fine scrap trap 172. To facilitate capture of the gray water, the opening 174 can be in the top surface 160 of the tank 156. In some configurations, the opening 174 can be encircled by a splash curb or the like (e.g., an upwardly extending protrusion); the splash curb can contain and control splashing of water that may be caused by the velocity of the water released from the drain outlet 140 or the outlet 134 when the water hits the fine scrap trap 172.

The fine scrap trap 172 can be sized and configured to cooperate with the opening 174 in the tank 156. In some configurations, the opening 174 can be configured such that the fine scrap trap 172 can be formed as a tray. Forming the fine scrap trap 172 as a tray that slides generally transverse to the direction of water flow (e.g., providing a fine scrap trap drawer) can improve access to the fine scrap trap 172; providing a scrap trap 172 that inserts from the top, however, simplifies construction and reduces a need to seal around the fine scrap trap 172. In some configurations, the fine scrap trap 172 can be configured to directly underlie an existing scrap trap tray of the warewashing machine 104. Such a configuration provides for enhanced filtration while providing a more compact construction. In some configurations, the gray water from the warewashing machine can be carried to the tank 156 and/or the fine scrap trap 172 with conduit that is connected to the warewashing machine with a quick disconnect coupling. The conduit can be pivotally connected to the scrap trap of the warewashing machine, for example but without limitation. Thus, the conduit can be pivoted up and access to the fine scrap trap can be improved. In addition, complete removal of the conduit also can improve access to the auxiliary unit for cleaning and the like.

In the illustrated configuration, the fine scrap trap 172 is sized and configured for insertion into a cavity defined by the tank 156 through the opening 174 in the top 160. The illustrated fine scrap trap 172 is generally cylindrical. The fine scrap trap 172 can comprise an upper flange 176 that extends laterally outward from a side wall 180 of the fine scrap trap 172. The upper flange 176 can support the fine scrap trap 172 when it has been inserted into the opening 174 in the tank 156. The side wall 180 can comprise one or more support members 182 that can define a general shape for the side wall 180. A fine mesh or other suitable material 184 can be used form the balance of the side wall 180. A similar construction also can be used to form a bottom 186 of the fine scrap trap 172.

The illustrated fine scrap trap 172 is sized and configured to be recessed into the tank with the bottom 186 of the fine scrap trap 172 being vertically lower than the top 160 of the tank 156. In some configurations, the bottom 186 of the fine scrap trap 172 can be positioned vertically higher than a high-water level of the tank (which can be controlled by an overflow outlet, as will be discussed). By recessing the bottom 186 (or other surface that may cause splashing when contacted by the water emitted from the warewashing machine 104), splashing can be at least partially contained. Splashing of water out of the tank 156 is desired to be minimized or eliminated because such splashing of water will require clean-up at the end of operations and, in many installations, the warewashing machine 104 will be in the way during clean-up, which causes clean-up to be more difficult.

In some configurations, the fine scrap trap 172 can incorporate one or more splash reduction features. For example, but without limitation, the fine scrap trap 172 can include a cone or other flow spreading device positioned within the fine scrap trap 172 or forming at least a portion of the fine scrap trap 172. In some configurations, the bottom 186 of the fine scrap trap 172 can be conical downward or frustoconical downward. The feature can be formed of mesh or can be a solid flow diffusing component. The splash reduction feature or features can help slow the rush of water toward the bottom of the fine scrap trap, which can reduce the splashing experienced when the water contacts the bottom of the fine scrap trap 172.

With reference again to FIGS. 2 and 3, the illustrated auxiliary device 150 can include support features 190. In the illustrated configuration, the support features 190 can include rails 192 that are mounted to the tank 156. The rails 192 can be mounted to, or formed as a part of, two or more of the front, rear, left and right walls 164, 166, 168, 170. The rails 192 can be used to fit to existing structures of the warewashing machine 104 (e.g., parts of the frame 132) or to existing structures of the air-drying table 106. Thus, such a configuration provides for a compact mounting arrangement.

In some configurations, however, casters, leveling feet (see FIG. 5), a support superstructure or the like can be provided to support the tank and can define support features 190. For example, leveling feet can be provided under or alongside of the tank 156. The leveling feet would allow for the leveling of the tank to reduce the likelihood of extreme floor pitches causing issues with water level maintenance while still allowing for portability of the auxiliary device 150 when empty for purposes of cleaning the auxiliary device 150 and the surrounding area. Moreover, when leveling feet or the like are used, it is possible to vary the pitch of the bottom 162 of the tank 156 such that the fluid contained within the tank 156 can be directed to one end of the tank 156 or another, as desired. For example, by positioning a drain in a lower portion of the tank, it is possible to empty the tank 156 more completely for cleaning.

Furthermore, raising the bottom 162 of the tank 156 above the surface of the floor improves the ability to clean beneath the tank 156. In some configurations, the bottom 162 of the tank 156 is raised to be at least 2 inches above the floor. In some configurations, the bottom 162 of the tank 156 is raised to be at least 6 inches above the floor. Other heights also are possible.

With reference to FIG. 3, a water level control assembly 200 is shown. The water level control assembly 200 can define an overflow outlet for the tank 156. The tank 156 can include an outlet aperture 204 (see FIG. 4), the bottom of which can correlate to the highest desired water level. In the illustrated configuration, an outlet conduit 202 can be mounted to the outlet aperture 204 to direct any overflow through the outlet conduit 202 to a suitable drain location (e.g., a drain in a floor sink or a floor drain). The illustrated configuration advantageously obviates any need for a pump, any sensors or other mechanical components to maintain the water level below a predetermined level. The outlet conduit 202 preferably terminates at least 1 inch from the top of any floor sink or floor drain; such a location can reduce splashing while providing sufficient clearance to clean the floor or floor sink. Other configurations are possible.

In the illustrated configuration, the outlet aperture 204 can extend through at least one of the sidewalls (e.g., the front, rear, left and right walls 164, 166, 168, 170) to the outlet conduit 202. In some configurations, the bottom 186 of the fine scrap trap 172 can define a generally horizontal plane that generally intersects or is positioned vertically higher than the outlet aperture 204. In some less desired configurations, the bottom 186 of the fine scrap trap 172 can define a generally horizontal plane that is vertically lower than any portion of the outlet aperture, but such configurations allow the contents of the fine scrap trap 172 to float when the water level is at the high water level defined by the water level control assembly 200.

With reference again to FIG. 2, the auxiliary device 150 can include a fresh water supply assembly 210. The fresh water supply assembly 210 can be configured to allow the addition of fresh water to the tank 156 as needed or desired. For example, at the start of each work day, the tank 156 will not have a supply of gray water for use by the pre-rinse station 102 and the fresh water supply assembly 210 can be used to provide an initial priming of the system for the first load of dishes of the day. In some configurations, about two inches of water is used for the initial priming. In some configurations, sufficient water is provided to fully cover an outlet that leads to a pump. Moreover, when pre-rinsing overly soiled dishes, it may be necessary to use more than the volume of gray water supplied by the warewashing machine 104; in such instances, the fresh water supply assembly 210 can provide makeup water.

Figure 4:
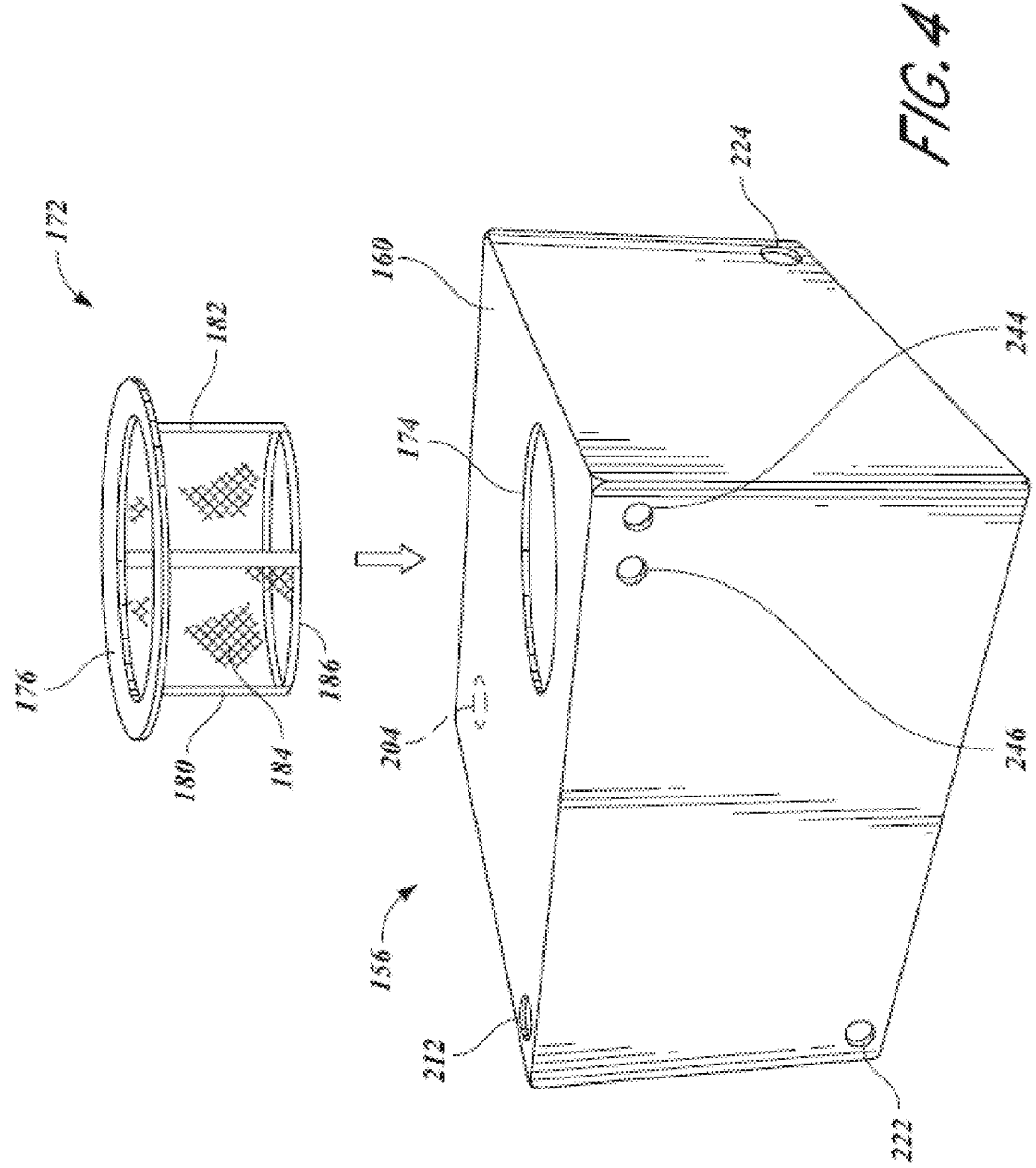
FIG. 4 is a perspective view of a tank and a fine scrap trap of the auxiliary device of FIG. 2.

The fresh water supply assembly 210 can be in fluid communication with the cavity of the tank 156 through a fresh water supply opening 212 (see FIG. 4). In some configurations, the opening 212 is positioned vertically higher than the overflow aperture 204. In some configurations, the opening 212 is positioned vertically higher than the overflow aperture by at least 2 times the diameter of the opening 212 and/or 2 times an inner diameter of any flow path connected to the opening 212. In the illustrated configuration, the opening 212 is positioned along the top 160 of the tank 156. In any event, given the relative vertical positioning of the opening 212 and the overflow aperture 204, the water level in the tank 156 is unlikely to allow gray water to flow upwardly into the fresh water supply through the fresh water supply assembly 210.

In the illustrated configuration, the fresh water supply assembly 210 can include a control valve 214 that can be manually manipulated to control the flow of fresh water through a supply conduit 216 into the tank 156. In some configurations, a backflow prevention device 220 can be integrated into or coupled with the supply conduit 216. The backflow prevention device 220 can have any suitable configuration and can help to further reduce the risk of any contamination by the gray water.

With reference to FIG. 4, a first outlet 222 from the tank 156 is illustrated. The outlet 222 advantageously is positioned generally vertically below the fresh water supply assembly 210, which increases the likelihood of rapid availability of water under low water conditions. Other locations also are possible. Moreover, the location of the fresh water supply assembly 210 can be varied depending upon the construction and layout of the warewashing station 100. In other words, it is helpful to have easy access to the control valve 214 and, for at least this reason, the location of the fresh water supply assembly 210 may vary depending upon the application.

With reference still to FIG. 4, the tank 156 also includes a second outlet 224. One or both of the first and second outlets 222, 224 can extend through the bottom 162 of the tank 156 or one or more of the sides (e.g., front, rear, right and left walls 164, 166, 168, 170). Desirably, the first and second outlets 222, 224 are sufficiently low relative to an inner bottom of the tank 156. As will be described, the first outlet 222 is fluidly connected to a supply pump while the second outlet 224 is fluidly connected to a drain valve. Thus, the first outlet 222 benefits from a low position because it increases the available water for use and the second outlet 224 benefits from a low position because it helps to more fully drain the tank 156 at the end of operations.

In some configurations, the inner bottom surface of the tank 156 is generally planar but, in some configurations, the inner bottom surface of the tank 156 can include features to help direct flow to one or both of the first and second outlets 222, 224. For example, in some configurations, a triangle, a pyramid, a cone or the like can be positioned to cause the water to move toward the sides of the tank 156. In one configuration, the inner bottom surface slopes gently toward the second outlet 224 throughout the bottom of the tank 156 because the second outlet 224, which can define an evacuation outlet, is used to substantially fully drain the tank 156 while the first outlet 222 supplies a pump and, therefore, should be fully or substantially submerged during operations and, if not, the fresh water supply assembly 210 can be used to augment the water supply within the tank 156.

With reference to FIG. 2, a spigot 226 can be connected to the tank 156 at the second outlet opening 224. The spigot 226 can be used at the end of operations to drain the gray water from the tank. Accordingly, the sizing of the spigot 226 can be determined, at least in part, by the desired flow rate for emptying the tank 156 at the end of operations. In some configurations, a hose can be used to direct the flow to a floor drain or a floor sink. In some configurations, a bucket can be used to transfer the remnants from the tank 156 via the spigot 226. Other suitable configurations also can be used.

A pump 230 can be supported by the auxiliary device 150 or can be mounted separate of the auxiliary device 150. The pump 230 in the configuration illustrated in FIG. 2 is mounted to the tank 156. More particularly, in the configuration illustrated in FIG. 2, the pump 230 is mounted to one of the side walls of the tank 156. The pump 230 can be secured using four fasteners, which allows for rapid replacement and exchange if desired. In some configurations, the pump 230 can be mounted to the top 160 of the tank 156. By mounting the pump to the top of the tank 156, the pump 230 and any electrical connections can be positioned above any anticipated water level.

The pump 230 can have any suitable configuration. In one configuration, the pump 230 can provide a maximum flow rate of about two gallons per minute and a pressure of 60 psi. In one configuration, the pump is a FLOJET model number D3835B5011A. The pump 230 preferably is configured to run only on demand. In other words, the pump 230 does not run unless the pre-rinse unit 114 is being used. Other pumps and other configurations can be used. The illustrated configuration is advantageously simple in construction in that no floats or other components are used to indicate or ameliorate a low water condition; rather, the pump 230 simply ingests air with the water and sputtering at the pre-rinse unit 114 will indicate a need for additional water.

A fitting 232 can be used to join a supply conduit 234 to the first outlet 222. In other words, a first end of the supply conduit 234 can be connected to the first outlet 222 with the fitting 232. A second end of the supply conduit 234 can be connected to by another fitting 235 to an inlet of the pump 230. One or both of the fittings 232, 235 can be formed of brass, stainless steel or plastic. In some configurations, one or more of the fittings 232, 235 can be formed as a quick-connect type of fitting. In some configurations, a screen or other filter can be disposed at the inlet of the supply conduit 234, at the outlet of the supply conduit 234 or both. The supply conduit 234 can be a braided conduit or can have any other suitable configuration.

In some configurations, a filter 237 can be positioned at a location between the first outlet 222 of the tank 156 and the inlet of the pump 230. In some configurations, the filter 237 can be positioned along the supply conduit 234. The filter 237 can be any suitable filter. In some configurations, the filter 237 is an in-line flow through filter. The filter can filter remnants of food products that remain even after the scrap traps discussed above. For example, in restaurants serving bean-based food items, the beans can be reduced to a paste-like consistency, which may not be captured by either of the scrap traps. Thus, the filter 237 can optionally be installed between the tank 156 and the pump 230, as schematically illustrated in FIG. 5.

An outlet of the pump 230 can be connected to the inlet 126 of the pre-rinse unit 114. In some configurations, a fitting 239 can be used to connect the delivery conduit 236 to the pump 230. The fitting 239 can be formed of brass, stainless steel or plastic. In some configurations, the fitting 239 can be formed as a quick-connect type of fitting. In some configurations, a delivery conduit 236 extends from the outlet of the pump 230 to the inlet 126 of the pre-rinse unit 114. The delivery conduit 236 can include a first length that extends to a tee fitting and two lengths that connect the tee fitting to the portions of the pre-rinse unit 114 that otherwise would connect to the hot water faucet 122 and the cold water faucet 124 respectively. By connecting to both portions of the pre-rinse unit 114, it is possible for the pump 230 to pressurize the line. In some configurations, the delivery conduit 236 may connect to only one of the portions of the pre-rinse unit 114 while the other portion can be plugged to reduce or eliminate the likelihood of the gray water contaminating a fresh water supply and to reduce or eliminate the likelihood that the pump 230 cannot pressurize the delivery conduit 236.

The tank 156 can be provided with water condition sensing components if desired. For example, in the illustrated configuration, a water temperature sensor 240 can be provided. The water temperature can be sensed in any suitable manner. In some configurations, the water temperature can be sensed using a thermometer. In addition, in some configurations, a water PH sensor 242 can be provided. The water PH sensor also can have any suitable configuration. In some configurations, the tank 156 can be provided with a port to include a PH tester, which could possibly be a dipper rod that enters the tank 156 through the top 160. Water PH often will be monitored in conjunction with warewashing machines. Typically, water PH is sensed using test strips in the food service industry. The water PH sensor 242 can be an electric PH sensor or the like and can be used to provide an indication of the water PH without the need for repeated testing of PH using the expensive PH test strips. In some configurations, one or more of the temperature and PH can be simply indicated in a go-no go style while, in other configurations, relative values can be provided. For example, a PH of less than 13 is desired and can be indicated by a first color indicator while a PH exceeding that value can be indicated by a second color indicator. In some configurations, a PH of less than 10 is achieved. The PH can be monitored for many reasons, including monitoring for levels that can shorten the life of certain components of the auxiliary device 150. Ports 244, 246 for the sensors can be provided through one or more walls of the tank 156. Any suitable placement and number of ports can be provided.

The pump 230 can be connected to a switch 246 (see FIG. 5). The switch 246 can have any suitable configuration. In some configurations, the switch 246 can be water tight or suitable rated for water use. The switch 246 can be used to supply power to and remove power from the pump 230. As such, a power supply cord 248 can be connected to the switch 246. Any suitable power supply cord 248 can be used and any suitable power supply can be provided to the pump 230.

In the configuration of FIG. 5, a mounting panel 250 can be used to support one or more of the components that define the transfer portion 154. The mounting panel 250 can be formed of any suitable material. In some configurations, the mounting panel 250 is formed from starboard, plastic, stainless steel or the like. In some configurations, the mounting panel 250 is formed of a water-resistant material. In some configurations, the mounting panel 250 can be an enclosure or housing or the like. In some configurations, the mounting panel 250 is white.

In the illustrated configuration, the mounting panel 250 supports the pump 230. In the illustrated configuration, the mounting panel 250 supports the switch 246. Other components also can be supported by the mounting panel 250 (e.g., the filter 237). Through the use of disconnects (for the fluid components and/or the electrical components), the mounting panel 250 provides an easily replaced component in the event of pump or switch failure, for example but without limitation. In addition, the mounting panel facilitates mounting the electrical components at a location that is suitable. Further, by mounting the pump 230 to the mounting panel, the pump 230 is moved upward to a location that removes it from the foot region such that kitchen workers are less likely to make inadvertent contact with the pump 230.

In some configurations, the transfer portion 154 and the holding portion 152 are elevated above the floor. For example, as shown in the auxiliary device 150 illustrated in FIGS. 6-8, the tank 156 can be spaced apart from the floor by a frame 260. This can facilitate cleaning beneath the auxiliary device 150 (e.g., with a broom or mop) and/or can aid in satisfying certain health codes. Because the auxiliary device 150 is configured for use in a wet environment (dishwashing stations), the frame 260 can be made of a corrosion resistant material, such as plastic, stainless steel, aluminum, or otherwise.

Figure 6:
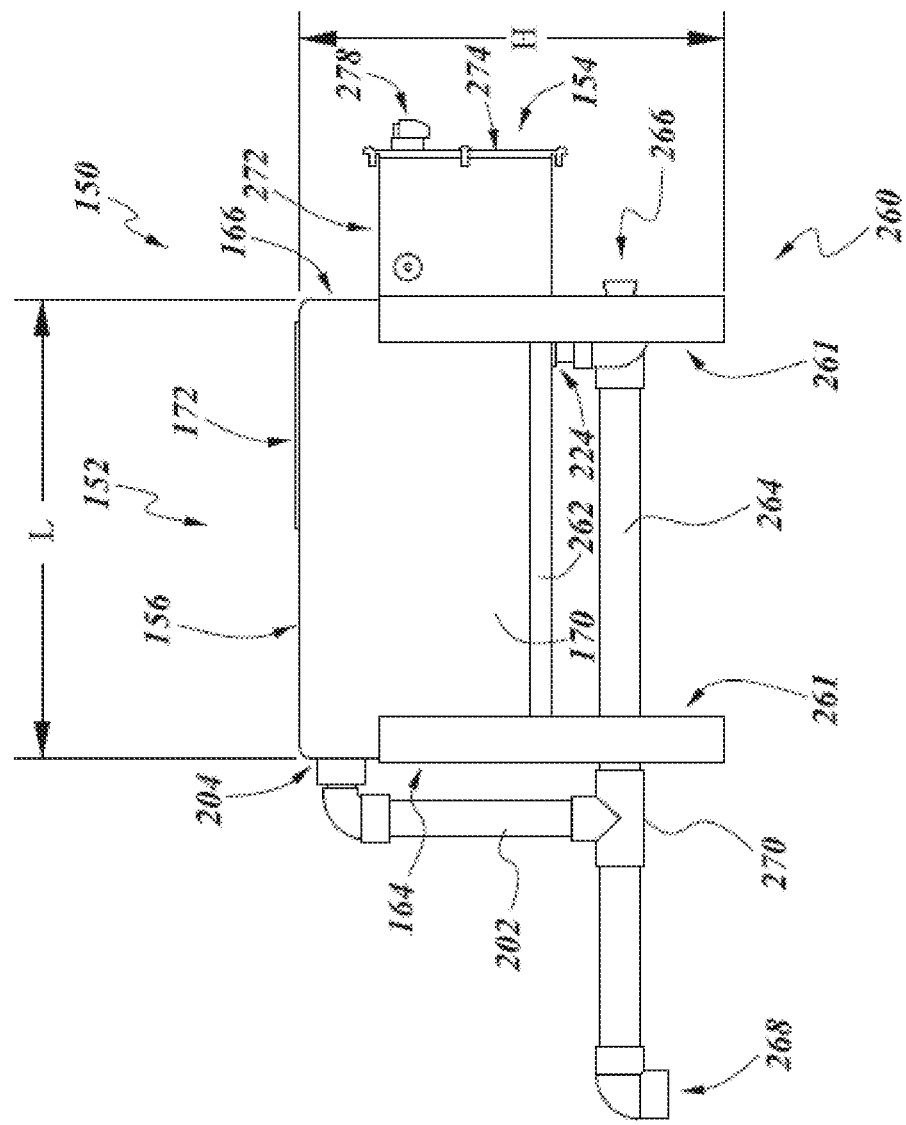
FIG. 6 is a side elevation view of the auxiliary device of FIG. 2 with an elevated holding portion and a transfer portion.
Figure 7:
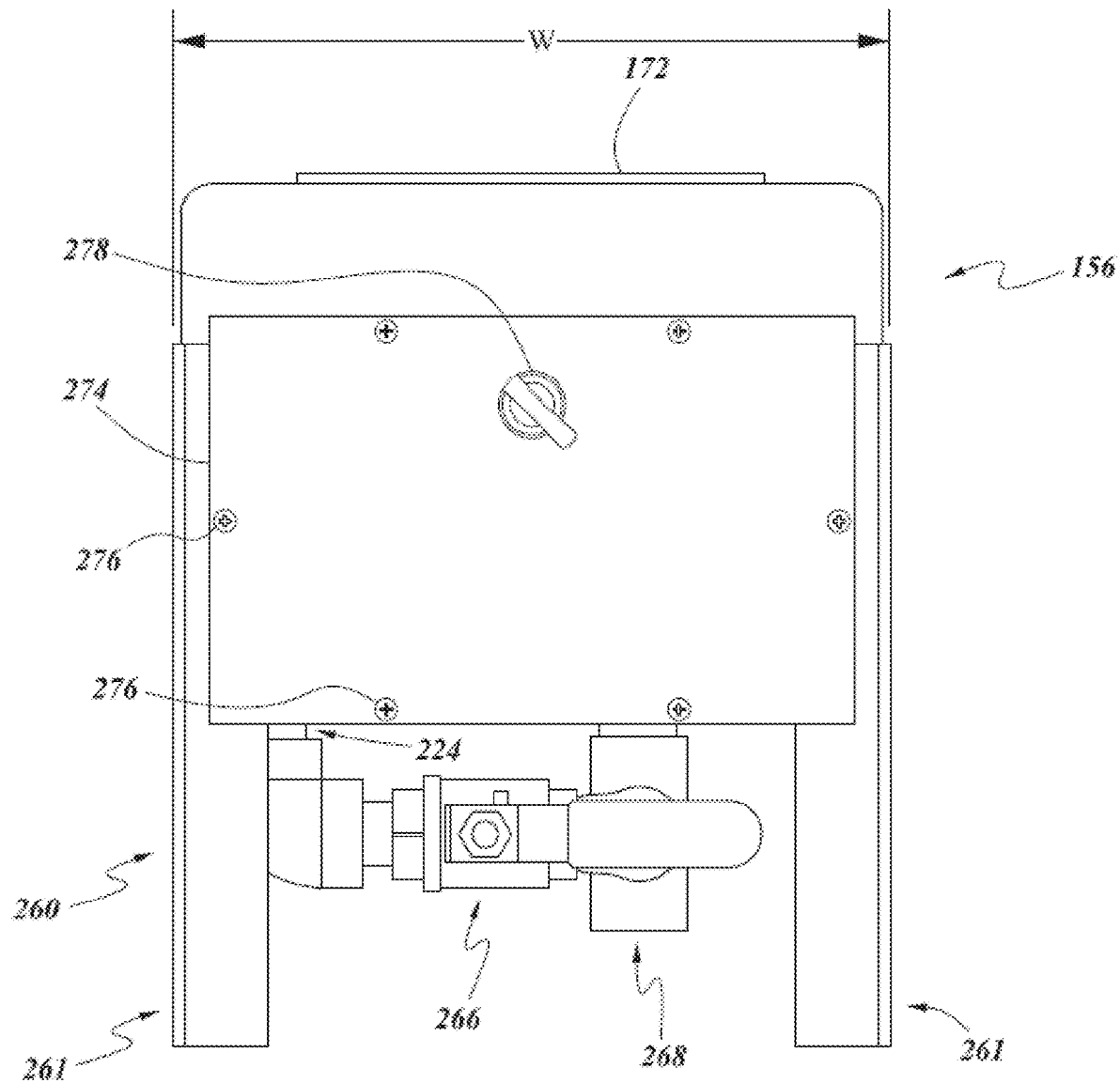
FIG. 7 is a rear elevation view of the auxiliary device of FIG. 6.
Figure 8:
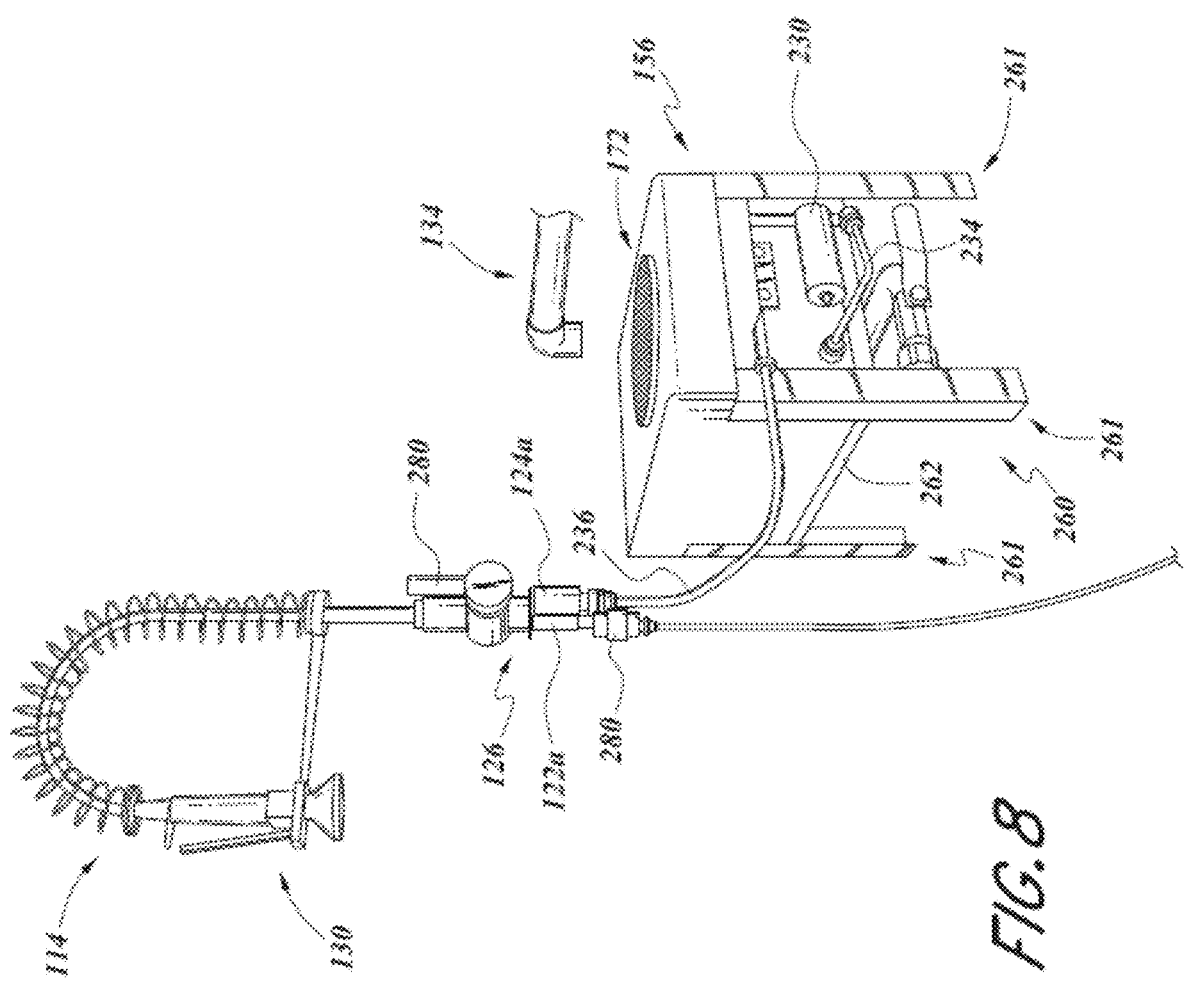
FIG. 8 is a perspective view of the auxiliary device of FIG. 6 and certain associated components of the commercial warewashing station of FIG. 1, with an enclosure of the auxiliary device not shown for purposes of presentation.

As shown, the frame 260 can include a plurality of legs 261, such as one leg at each corner of the tank 156. In various embodiments, the legs 261 comprise rigid members, such as beams. For example, as shown in FIGS. 6-8, the legs 261 can be constructed of L-beams or other structural members (e.g., I-beam, C-beam, hollow structural section, or otherwise). The legs 261 can elevate the tank 156 above the floor. In some implementations, the vertical distance between the bottom of the legs 261 and the bottom 162 of the tank 156 is at least about: 4 inches, 5 inches, 6 inches, or 7 inches. In various embodiments, the bottom 162 of the tank 156 and/or the pump 230 is spaced above the ground between 4 inches and 6 inches.

In some implementations, the frame 260 is configured to maintain the center of gravity of the tank 156 relatively low to the ground, which can reduce the chance of the tank 156 tipping over. In certain embodiments, the top of the tank 156 is at a height H that is less than or equal to the front-to-back length L of the tank 156. For example, the height H can be less than about 15 inches and the length L can be at least about 16 inches. In some implementations, the side-to-side width W of the frame 260 is less than or equal to the height H of the top of the tank 156. For example, the height H can be at least about 15 inches and the width W can be less than about 12 inches. In some implementations, the ratio of the width W of the frame 260 to the height H of the top of the tank 156 is at least about: 0.6, 0.7, 0.8, 0.9, 1.0, 1.1, or otherwise.

In some implementations, a portion of the legs 261 is configured to engage with a corresponding portion of the tank 156. For example, the legs 261 can have a shape that corresponds to a portion of the tank 156. This can allow the correspondingly shaped portions of the legs 261 and the tank 156 to be mated together. An example of such mating correspondence is illustrated in FIGS. 6-8. As shown, the corners of the tank 156 can be received in correspondingly shaped corners of the legs 261 (e.g., the internal corner of the L-beam). In some embodiments, an upper portion of the each of the legs 261 can engage with two sides of the tank 156. This can secure the tank 156 within the legs 261, limit movement of the tank 156, and/or reduce the chance of the tank 156 falling out of the frame 260.

The legs 261 have a constant length in the embodiment illustrated. However, certain variants have legs 261 with an adjustable length. For example, the legs 261 can include telescoping elements and/or leveling feet that enable the length of each leg 261 to be individually adjusted. Varying the length of the legs 261 can aid in adjusting the level of the tank 156, such as to locate the tank 156 at a desirable height under the warewashing machine 104 and/or to pitch the tank 156 to encourage liquid in the tank 156 to flow toward a certain portion of the tank 156 (e.g., the second outlet 224). In some configurations, the legs 261 facilitate moving the tank 156. For example, the legs 261 can include casters, wheels, or the like.

As shown, the frame 260 can include a base 262 that is configured to support and/or cradle the tank 156. The base 262 can connect with one or more of the legs 261, such as with welds, fasteners, or otherwise. In certain implementations, the base 262 comprises a plurality of rigid members, such as L-beams or other structural members (e.g., I-beam, C-beam, hollow structural section, or otherwise). In some embodiments, the base 262 comprises a shelf on which the tank 156 is positioned. For example, the base 262 can comprise a generally planar member, such as a sheet or plate of metal or plastic. In some embodiments, the base 262 extends generally or completely continuously between the legs 261.

As illustrated in FIGS. 6-8, elevating the bottom of the tank 156 above the floor can provide a passageway beneath the tank 156. Some embodiments include a drain pipe 264 in the passageway. The drain pipe 264 can extend along the entire, a substantial portion of, or at least a majority of the front-to-back length of the tank 156. The drain pipe 264 can connect the second outlet 224, which can be located in the bottom 162 of the tank 156. In some embodiments, the drain pipe 264 includes a valve 266, such as a manually operated ball valve. The valve 266 can be closed to maintain the water in the tank 156, and can be opened to allow the water to exit the tank 156, flow into the drain pipe 264, and be discharged at a drain pipe outlet 268. The outlet 268 can be positioned over a floor sink or floor drain. This can be more convenient than attaching a hose to the spigot 226 and/or directing the hose to a floor drain or a floor sink. In some configurations, the drain pipe outlet 268 is configured to allow a bucket to be placed under the drain pipe outlet 268 to collect the contents of the tank 156.

In certain implementations, the drain pipe 264 includes a fitting 270 (e.g., a tee), which connects with the outlet conduit 202. As previously discussed, the outlet conduit 202 can connect with the outlet aperture 204 to direct any overflow from the tank 156 through the outlet conduit 202. The overflow can flow through the drain pipe 264 and be discharged at the drain pipe outlet 268. In various embodiments, the drain pipe 264 is pitched so that any water in the drain pipe 264 flows by force of gravity toward the drain pipe outlet 268. In various embodiments, the drain pipe outlet 268 is lower than the outlet aperture 204, second outlet 224, valve 266, and/or drain pipe 264.

As illustrated in FIGS. 6 and 7, the auxiliary device 150 can comprise a protective enclosure 272, such as a metal or plastic box. The enclosure 272 can house and protect certain components of the auxiliary device 150. For example, the pump 230 can be positioned in the enclosure 272. This can reduce the chance that kitchen workers will inadvertently contact the pump 230, which could result in harm to the workers and/or the pump 230. In various embodiments, the enclosure 272 can connect with one or more of the legs 261 and/or the base 262, such as with welds, fasteners, or otherwise.

The enclosure 272 can be located on or adjacent to the tank 156. For example, as illustrated, the enclosure 272 can be positioned on the front, rear, or a side of the tank 156. This can place the enclosure in a convenient location to access. In some variants, the enclosure 272 is positioned on the top 160 of the tank 156, which can place the enclosure above the liquid in the tank 156. Compared to certain embodiments in which the pump 230 is positioned away from the tank 156 (e.g., on a mounting panel 250 on a wall, such as is shown in FIG. 5), locating the pump on or adjacent to the tank 156 can reduce the distance that the water from the tank 156 needs to travel to reach the pre-rinse unit 114 and/or can reduce the power required to pump the water from the tank 156 to the pre-rinse unit 114.

As shown, the enclosure 272 can include an access door 274, which can be opened to enable access to the components in the enclosure 272. The door 274 can be secured, such as with a lock or latch. In the embodiment illustrated, the door 274 is secured with a plurality of fasteners 276, such as bolts. In some implementations, the door 274 is configured to allow access to one or more controls without needing to open the door 274. For example, a switch 278 can be mounted on or through the door 274. The switch can be actuated, without opening the door 274, to control operation of the pump 230. For example, the switch 278 can control the supply of power to the pump 230.

As illustrated in FIG. 8, the outlet of the pump 230 can be connected to the inlet 126 of the pre-rinse unit 114. As mentioned above, in some configurations, a fitting can be used to connect the delivery conduit 236 to the pump 230. The fitting can be formed of stainless steel or plastic. In some configurations, the fitting can be formed as a quick-connect type of fitting.

As previously described, the pre-rinse unit 114 can be configured to connect with hot and cold water faucets 122, 124. For example, the pre-rinse unit 114 can include connection elements 122A, 124A configured to connect with the hot and cold water faucets 122, 124, respectively. As shown in FIG. 8, the delivery conduit 236 can be connected to the connection elements 122A and a fresh water conduit 278 can be connected with the connection element 124A. In some variants, the connections are reversed, such that the delivery conduit 236 is connected to the connection elements 122A, 124A and the fresh water conduit 278 is connected with the connection element 122A. The connections with the connection elements 122A, 124A can be accomplished with a fitting, such as a stainless steel or plastic fitting. In some configurations, the fitting can be formed as a quick-connect type of fitting.

The fresh water conduit 278 can include a backflow inhibitor, such as a check valve 280. In some embodiments, the check valve 280 comprises a diaphragm valve, umbrella valve, duckbill valve, ball check valve, or otherwise. In various embodiments, the check valve 280 can inhibit or prevent gray water from flowing upstream into the fresh water conduit 278.

Certain embodiments include a vacuum breaker. The vacuum breaker can be configured to inhibit or prevent liquid from being siphoned backward into the fresh water conduit 278. Some embodiments are configured to reduce or eliminate a pressure differential (e.g., a vacuum) between ambient and one or more of the conduits of the station 100. For example, in certain embodiments, the vacuum breaker is configured to reduce or eliminate a vacuum between ambient and the delivery conduit 236 and/or between ambient and the fresh water conduit 278. The vacuum breaker can comply with certain inspection standards, such as performance and/or sanitation criteria. For example, the vacuum breaker can be rated, listed, and/or certified by NSF International. In some embodiments, the check valve 280 comprises the vacuum breaker.

As shown, in some embodiments, the pre-rinse unit 114 includes a selector 280, such as an adjustable valve. The selector 280 can be configured to vary and/or select the relative amounts of gray water and fresh water that is dispensed from the pre-rinse unit 114. For example, in some implementations, when the selector 280 is in a first position, the pre-rinse unit 114 dispenses 100% gray water, and when the selector 280 is in a second position (e.g., opposite the first position), the pre-rinse unit 114 dispenses 100% fresh water. In some implementations, the selector 280 is a two-position valve, such that the pre-rinse unit 114 either provides 100% gray water or 100% fresh water. In some embodiments, the selector 280 is a variable valve. In certain such embodiments, when the selector 280 is in an intermediate position between the first and second positions, the pre-rinse unit 114 dispenses a blend of gray water and fresh water. The relative amounts of gray water and fresh water can vary based on the location of the selector 280. For example, as the selector 280 is moved toward the first position, the percentage of gray water can increase and the percentage of fresh water can decrease, and as the selector 280 is moved toward the second position, the percentage of gray water can decrease and the percentage of fresh water can increase. As illustrated, the selector 280 can include a handle, which can enable a user to adjust the relative amounts of gray water and fresh water.

Figure 9:
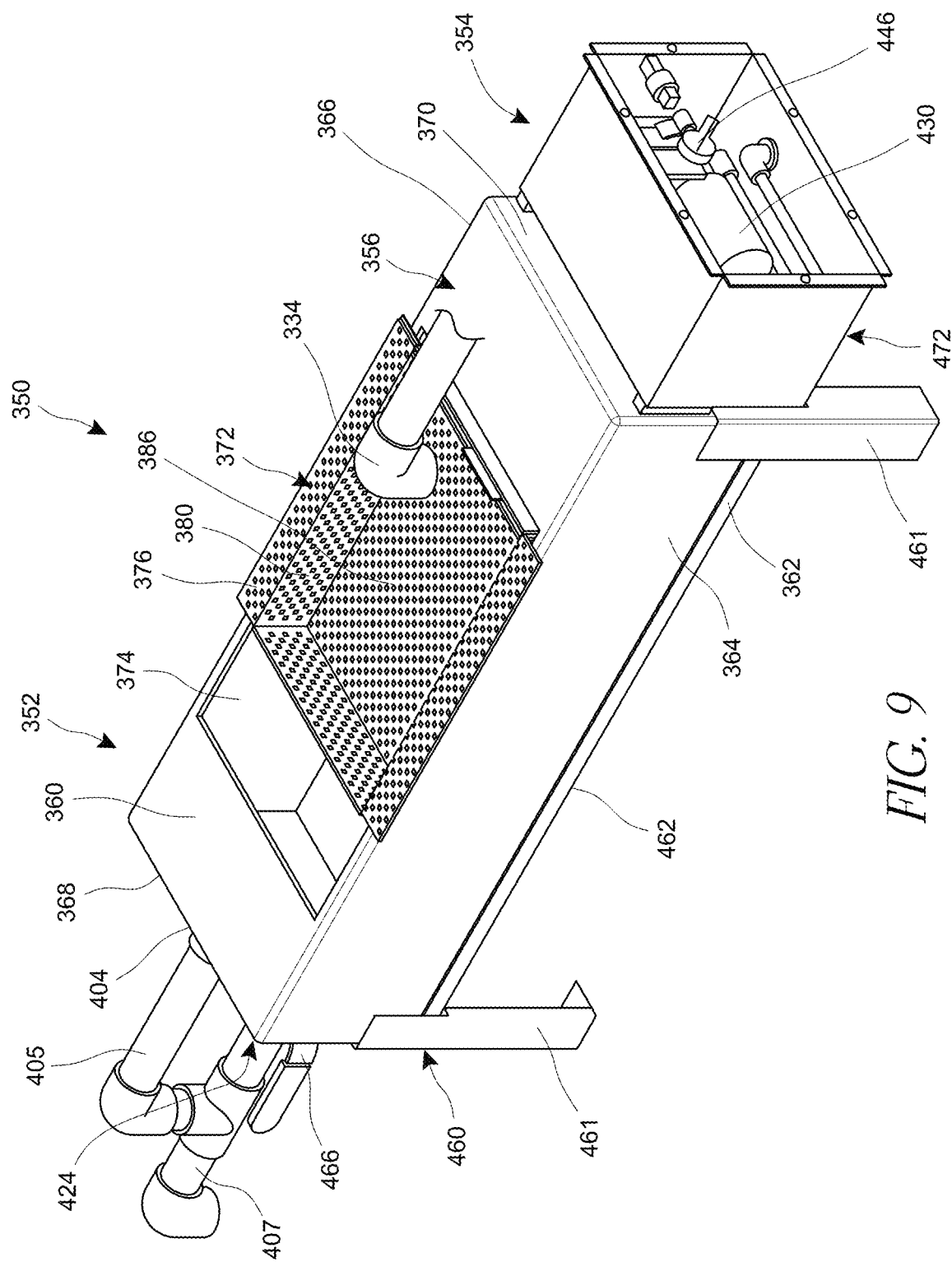
FIG. 9 is a perspective view of another auxiliary device that can be used with a commercial warewashing station.
Figure 10:
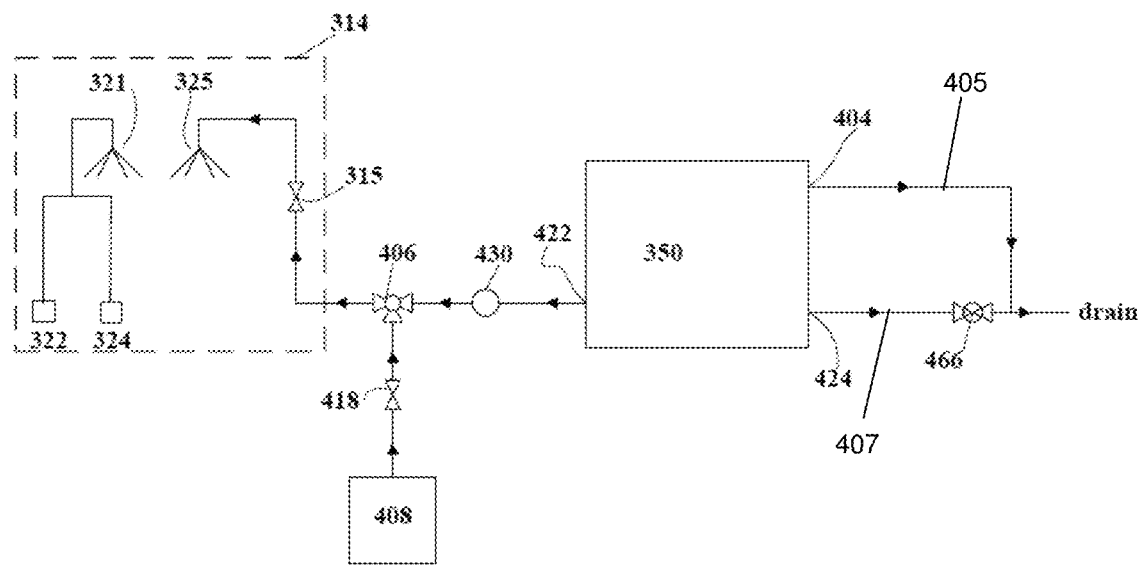
FIG. 10 schematically illustrates a configuration of the auxiliary device of FIG. 9 and certain associated components.
Figure 11:
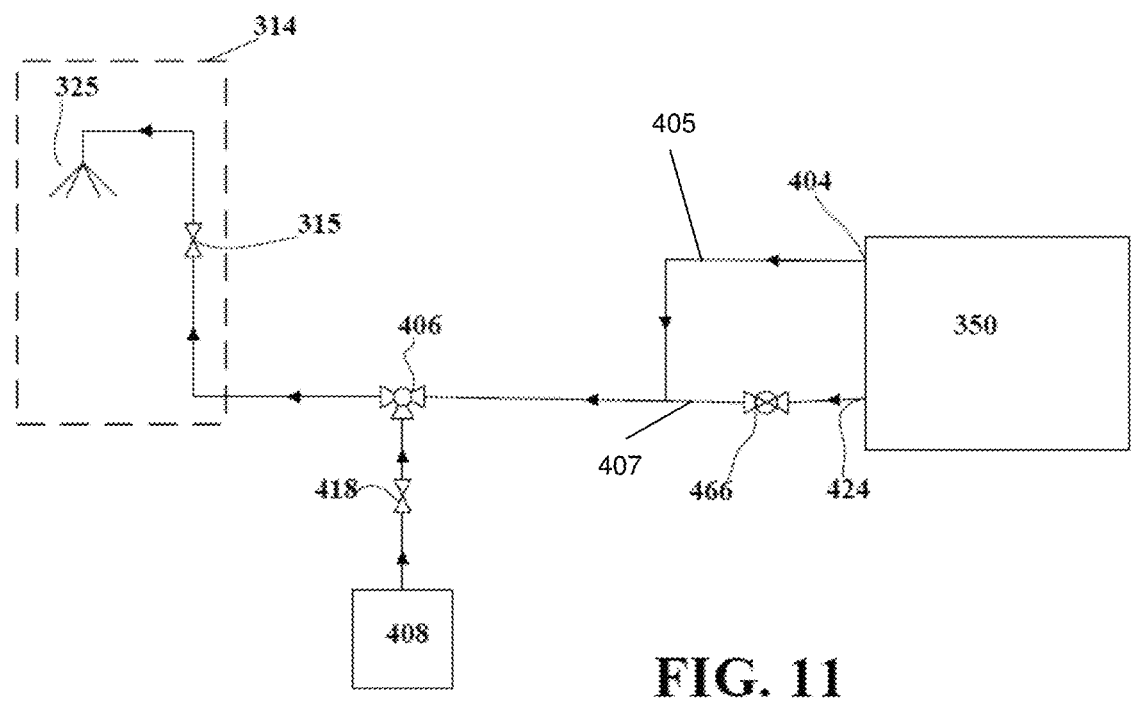
FIG. 11 schematically illustrates another configuration of the auxiliary device of FIG. 9 and certain associated components.

FIGS. 9-11 illustrate another embodiment of an auxiliary device 350. The device 350 can be similar or identical to the device 150 in many ways and can include any of the features of the device 150. For example, the device 350 can include a holding portion 352 and transfer portion 354 that are similar or identical to the holding portion 152 and transfer portion 154, respectively. The device 350 can include a tank 356 that, like the tank 156, captures water from the warewashing machine.

As shown in FIG. 9, the tank 356 includes an opening 374 in the top surface 360. Water output from the warewashing machine can flow through the opening 374 and into the tank 356. The opening 374 can have any suitable size and configuration. In some configurations, the opening 374 can be surrounded by a splash curb or the like (e.g., an upwardly extending protrusion). The splash curb can be configured to contain and/or control splashing of water, such as may be caused by the velocity of the water released from the outlet 334.

In some configurations, the opening 374 receives a screen 372 (also called a scrap trap). The screen 372 can comprise a perforated tray, mesh, and/or filter that serves to separate larger food waste and the like from water released from the warewashing machine. In some configurations, the screen 372 comprises a tray, basket, cone, funnel, bag, or other suitable shape. In some configurations, the screen 372 of the auxiliary device 350 acts as the primary screen for the gray water. In some embodiments, the warewashing machine may include a screen of its own, or is connected to an external screen. This can allow the screen 372 to act as a secondary or other filtering mechanism for the gray water.

As shown in FIG. 9, the screen 372 can be received in the opening 374 such that the bottom 386 of the screen 372 is vertically lower than the top 360 of the tank 356. In some configurations, the bottom 386 of the screen 372 can be about level with the top 360 of the tank 356. The screen 372 can comprise an upper flange 376 that extends laterally outward from a side wall 380 of the screen 372. The upper flange 376 can support the screen 372 when it has been inserted into the opening 374 in the tank 356. The upper flange 376 can have perforations on the surface or can be continuous. The side wall 380 can comprise one or more support members that can define a general shape for the side wall 380. A fine mesh, perforated plastic, metal, or other suitable material can be used to form the balance of the side wall 380. A similar construction can be used to form a bottom 386 of the screen 372. The screen 372 can be a unitary piece. The screen 372 can have discrete components.

By recessing the bottom 386 (or other surface that may cause splashing when contacted by the water released from the warewashing machine), splashing can be reduced and/or at least partially contained. Splashing of water out of the tank will require clean-up and the warewashing machine may be in the way during clean-up, which causes clean-up to be more difficult. Thus, reducing or eliminating splashing can be desirable.

In some configurations, the bottom 386 of the screen 372 can be positioned vertically higher than a high-water level of the tank, which can be controlled by an overflow outlet 404. In some configurations, the bottom 386 of the screen 372 can define a generally horizontal plane that generally intersects or is positioned vertically higher than the overflow outlet 404. In some configurations, the bottom 386 of the screen 372 can extend along a generally horizontal plane that is vertically lower than any portion of the overflow outlet 404, such that the contents of the screen 372 can float when the water level is at the high water level defined by the overflow outlet 404 position.

In some embodiments, the screen 372 is moveable within the opening 374. For example, as shown, the screen 372 can be configured to slide in a direction that is generally perpendicular to the direction of water flow from an outlet 334 of the warewashing machine. This can facilitate access to the screen 372 and/or allows insertion from above. In some embodiments, the outlet 334 is connected to the warewashing machine with a conduit (e.g., a metal or plastic pipe), such as with a quick disconnect coupling. The conduit can be configured to be pivotally out of the way to allow access to the screen 372. In some implementations, the conduit can be removed from the warewashing machine, which can aid in accessing the screen 372 or other components of the device 350, such as for cleaning, maintenance, or other tasks.

In some embodiments, the screen 372 is configured to move (e.g., slide) within the opening 374 from a first position to a second position. The first position of the screen 372 can allow the screen 372 to be below the outlet 334 and receive the water and food scraps released by the warewashing machine. The second position of the screen 372 can allow the screen 372 to be removed from the outlet 334 of the warewashing machine and not receive the water and food scraps released by the warewashing machine. From the second position, the screen 372 can be lifted from the tank 356 without maneuvering the screen 372 around the outlet 334 of the warewashing machine. Maneuvering the screen 372 around the outlet 334 could involve tilting the tray and spilling the collected food scraps. In some configurations, when the screen 372 is in the second position away from the warewashing machine outlet 334, an additional screen can be placed in the opening 374 below the warewashing machine outlet 334. In some configurations, the opening 374 is between about 1.25 times and about 3 times the area of the screen 372. In some configurations, the opening 374 is about 1.3 times the area of the screen 372.

In the embodiment shown in FIG. 9, the screen 372 is in the first position and in a position to receive the water and food scraps from the outlet 334 of the warewashing machine. In the illustrated configuration, the screen 372 is moveable in a linear direction between the left wall 368 and the right wall 370. In some configurations, the screen 372 can be moveable in a nonlinear direction, such as being configured to be rotated between the first and second positions. In some configurations, the screen 372 can be moveable between the front wall 364 and the rear wall 366. In some embodiments, the screen 372 is configured to be removed from (e.g., lifted out of) the opening 374.

The screen 372 can comprise a plurality of screen elements and/or types, such as two, three, four, or more screen elements. For example, the screen 372 can include a coarse screen, which limits passage of larger particles, and a fine screen, which limits passage of finer particles (e.g., tomato skins, rice, etc.). This can reduce the chance of clogging the pre-rinse station or other components. In some applications, the fine screen incorporates a mesh, such as a stainless steel mesh. In some applications, the mesh has sufficiently small openings such that almost no rice can pass through the mesh intact. The screen elements can have the same or substantially similar shapes and/or sizes. In some variants, the screen elements can have differing shapes and/or sizes.

It may be advantageous to arrange the screen elements in series (e.g., on top of each other), such that the screens 372 are at least partially overlapping each other. This could be advantageous when one screen 372 is a coarse screen and another is a fine screen. The ability to layer the screens 372 allows the user to adjust the amount of filtering. For example, a user may not desire a high level of filtering. The user can move the fine screen to the other side of the opening so that the water from the warewashing machine outlet 334 does not pass through the fine screen. The user can leave the coarse screen in the opening so that the water from the warewashing machine outlet 334 passes through the coarse screen before entering the tank 356.

It may be advantageous to arrange the screen elements in parallel (e.g., side-by-side or partially overlapping). For example, this could be advantageous when a screen 372 becomes full or nearly full of food scraps. The full screen 372 can be slid out from under the warewashing machine outlet 334 and an empty screen 372 placed under the warewashing machine outlet 334.

In some embodiments, the device 350 includes a substantially and/or generally unimpeded bottom. For example, as shown in FIG. 9, some embodiments have no conduits, pipes, or outlets connected to and/or extending along and/or below the bottom of the tank 356. This can facilitate cleaning under the warewashing machine, such as with a mop.

The tank 356 can include an overflow outlet 404. In some embodiments, the height of the overflow outlet 404 above the bottom of the tank 356 correlates to the highest desired water level. The overflow outlet 404 can be positioned on the upper half of one or more of the sides of the tank (e.g., front, rear, right, or left walls). In the illustrated configuration, the overflow outlet 404 is positioned on an upper portion of the left wall 368.

The overflow outlet 404 can direct any overflow fluid to a suitable drain location (e.g., a drain in a sink or a floor drain). In the illustrated configuration, the overflow outlet 404 connects with an overflow conduit 405, which in turn connects with a drain conduit 407 in fluid communication with a drain outlet 424 of the tank 356. This can obviate the need for a pump, sensors, or other mechanical components to maintain the water level below a maximum and/or desired level. In some configurations, the overflow conduit 405 can be connected so as to direct the overflow fluid towards the pre-rinse unit 314.

The drain outlet 424 can be located on one or more sides of the tank 356. In the illustrated configuration, the drain outlet 424 is located on the same side as the overflow outlet 404. In some configurations, the drain outlet 424 and the overflow outlet 404 are located on different sides of the tank 356. The drain outlet 424 can be sufficiently low relative to an inner bottom of the tank 356. For example, in some configurations, the drain outlet 424 is located on the lower half of a side wall. A low position of the drain outlet 424 can aid in draining the tank and/or can increase the available water for use.

In the illustrated configuration in FIGS. 9 and 10, the drain conduit 407 includes a valve 466, such as a manually operated ball valve. The valve 466 can be closed to maintain the water in the tank 356 and can be opened to allow the water to exit the tank 356. The drain conduit 407 can direct the water to a suitable drain location (e.g., a drain in a sink or a floor drain), which can be plumbed to the sewer system. In some configurations, the drain conduit 407 can direct the gray water towards the pre-rinse unit 314. In some configurations, the drain conduit 407 connects to a pump, such as to pump, drain, and/or overflow fluid to another location.

In some configurations, the device 350 includes a gray water outlet 422. The outlet 422 can be configured to provide gray water from the tank 356 to the pre-rinse unit 314 via one or more conduits, such as is shown in FIG. 10. The outlet 422 can be located on the same side as the drain outlet 424. The outlet 422 and the drain outlet 424 can be located on different sides. In some configurations, the outlet 422 can be located on the opposite side of the tank 356 as the drain outlet 424.

In some embodiments, a pump 430 can drive the water from the outlet 422 towards the pre-rinse unit 314. An outlet of the pump 430 can be connected to the inlet of the pre-rinse unit 314. As previously described, the pump 430 can be positioned in an enclosure, such as is shown in FIG. 9. In some embodiments, the pump 430 is a dry pump, such that the pump 430 does not need to be primed and/or is configured to operate without liquid being present.

The pump 430 can be connected to a switch 446. The switch 446 can have any suitable configuration. In some configurations, the switch 446 can be water tight or suitably rated for water use. The switch 446 can be used to supply power to and remove power from the pump 430. As such, a power supply cord can be connected to the switch 446. Any suitable power supply cord can be used and any suitable power supply can be provided to the pump 430. In some configurations, the pump 430 can be powered by one or more batteries.

In some configurations, the transfer portion 354 and the holding portion 352 of the auxiliary device 350 are elevated above the floor. This can facilitate cleaning beneath the auxiliary device 350 (e.g., with a broom or mop) and/or can aid in satisfying certain health codes. For example, as shown in FIG. 9, the tank 356 can be spaced apart from the floor by a frame 460. The frame 460 can comprise a plurality of legs 461, such as one leg at each corner of the tank. In various embodiments, the legs 461 comprise rigid members, such as beams. In some configurations, a bottom 362 of the tank 356 is raised to be at least 2 inches above the floor. In some configurations, the bottom 362 of the tank 356 is raised to be at least 6 inches above the floor. Other heights are also possible.

In the illustrated configuration, in FIG. 9, the outlets are located on the side(s) of the tank 356. This can allow the tank 356 to have a substantially continuous bottom outer surface 362. In some configurations, the bottom outer surface of the tank 356 can be substantially flat. In some configurations, the bottom outer surface of the tank 356 can be sloped, rounded, or the like. In some configuration, the bottom of the tank 356 can be completely continuous with no openings. In other words, the bottom 362 of the tank 356 is an uninterrupted surface, such that there are no openings, outlets, or pipes along the bottom 362 of the tank 356.

Some health code regulations require a minimum height for the outlet 422 and/or outlet 424. By having the outlet located on the side of the tank 356, the bottom 362 of the tank 356 can be lower than in configurations when the outlet is located on the bottom 362 of the tank 356. The bottom 362 of the tank 356 can be under 2 inches above the floor, when the outlet is placed on the side of the tank 356. The drain outlet 424 is preferably placed on the lower half of a side wall of the tank 356 to aid in emptying the tank 356, which can aid in emptying the tank 356.

As illustrated in FIG. 9, the device 350 can comprise a protective enclosure 472, such as a metal or plastic box. The enclosure 472 can house and protect certain components of the auxiliary device 350. For example, the pump 430 can be positioned in the enclosure 472. This can reduce the chance that kitchen workers will inadvertently contact the pump 430, which could result in harm to the workers and/or the pump 430. In various embodiments, the enclosure 472 can connect with one or more of the legs 461 and/or a base 462 of the frame 460, such as with welds, fasteners, or otherwise.

Some embodiments are configured to introduce and/or mix a treatment agent into the flow of gray water before being dispensed at the pre-rinse unit 314. For example, as illustrated in FIG. 10, some embodiments include a valve 406 between the auxiliary device 350 and the pre-rinse unit 314 that allows a flow of the treatment agent to be added to the flow of gray water. The treatment agent can be bleach, a chemical sanitizer, softeners, soaps, or otherwise.

In some configurations, the valve 406 comprises a three-way valve. As shown in FIG. 10, a first inlet of the valve 406 can be fluidly connected to the auxiliary device 350. In some configurations, the pump 430 drives water from the tank 356 and into the first inlet of the valve 406. In various embodiments, the pump 430 can drive the fluid from an outlet of the valve 406 towards the pre-rinse unit 314.

A second inlet of the valve 406 can be connected to a treatment agent container 408, such as through a tube or other conduit. The treatment agent container 408 can have any suitable shape, size, and configuration. In some configurations, the shape and sizing of the treatment agent container 408 is less important than the internal volume of the container 408. For example, the treatment agent container 408 may be designed to hold the amount of treatment agent needed for one cycle of warewashing, one work day worth of cycles, one work week, or the like. In some configurations, the treatment agent container 408 can be a reusable, refillable container. In some configurations, the treatment agent container 408 is translucent to provide visual confirmation of the contents of the container 408. While the illustrated treatment agent container 408 is separate of the auxiliary device 350, it is possible to integrate the treatment agent container 408 into the auxiliary device 350.

The size and shape of the treatment agent container 408 can be determined based upon the application. In some embodiments, the treatment agent container 408 is configured to be positioned under one or more of the pre-rinse station, the warewashing machine, and/or the auxiliary device 350. The treatment agent container 408 can be designed to be placed on the floor, elevated off the floor, about level with the sink, or above the sink, depending on the spatial needs of the user. There may be local health codes that regulate the location of the treatment agent container 408.

Some embodiments include a selector 418 in the fluid flow path between the valve 406 and the treatment agent container 408. In some configurations, the selector 418 is an adjustable valve. The selector 418 can be configured to vary and/or select the amount of treatment agent that is dispensed from the treatment agent container 408. The selector 418 controls the amount of treatment agent that enters the valve 406. For example, in some implementations, when the selector 418 is in an open position, the treatment agent container 408 dispenses an amount of treatment agent, and when the selector 418 is in a closed position, the treatment agent container 408 prohibits flow of treatment agent. When the selector 418 is open and the pre-rinse unit 314 is in use, there is a continuous flow of treatment agent into the valve 406.

Treatment agent from the second inlet of the valve 406 can be introduced and/or mixed with the flow of gray water. In some implementations, the flow of gray water causes a decrease in pressure through the valve 406. This can automatically pull the treatment agent into the valve 406 by the Venturi effect, thereby reducing or eliminating the need for a pump between the treatment agent container 408 and the valve 406 and/or the pre-rinse unit 314.

With continued reference to FIG. 10, the outlet of the valve 406 can be fluidly connected to the pre-rinse unit 314. In some configurations, the outlet of the valve 406 can be connected to a nozzle, spray head, or the like. In the illustrated configuration, in FIG. 10, the outlet of the valve 406 connects to a gray water nozzle 325 that is separate from (e.g., spaced apart from) the fresh water nozzle 321. The fresh water nozzle 321 can be connected to one or more of a hot water supply 322 and a cold water supply 324. The gray water nozzle 325 can be connected to a valve 315, which is configured to open and close to allow and disallow gray water to flow out of the nozzle 325. In some configurations, the valve 315 can be actuated by a foot pedal. In some configurations, the valve 315 can be a foot pedal valve. The fresh water nozzle 321 can be connected to hot and/or cold water faucets. In some configurations, the fresh water nozzle 321 can be connected to a foot pedal valve.

FIG. 11 illustrates another embodiment of a gray water device. As shown, the drain outlet 424 and the overflow outlet 404 are fluidly connected to the valve 406. In some configurations, a pump (not shown) can aid in encouraging the gray water from the auxiliary device 350 to the pre-rinse station 314.

Methods of Installation

As discussed above, certain features, aspects and advantages of the present invention relate to the auxiliary device 150 and/or 350 being arranged and configured for installation without significant modification to the warewashing machine 104. As used herein, "without significant modification" means that the changes are easily reversible (e.g., reversing the changes does not require the use of a welder). For example, simply removing a scrap trap is easily reversible and simply redirecting a conduit through plumbing is easily reversible. On the other hand, a modification that requires a welding device, a saw, a grinder or the like is not easily reversible.

As such, one method of installation provides a simple connection. The inlet 126 to the pre-rinse unit 114 can be disconnected from the hot and cold water faucets 122, 124. The auxiliary device 150 can be moved into position proximate the warewashing station 100. In configurations having a mounting board, the mounting board can be secured to a desired location (e.g., a wall or other supporting structure). Any connections discussed above (e.g., those with quick-connect fittings) can be made. The auxiliary device 150 can be located such that the drain outlet 140 from the warewashing machine 104 empties into the inlet into the tank 156 (e.g., empties into the fine scrap trap 172) or the auxiliary device 150 can be located such that the outlet 134 empties into the inlet into the tank 156. In some techniques, a delivery conduit can be provided to transport the flow from the outlet 134 to the inlet and into the tank 156.

The first inlet 126 of the pre-rinse unit 114 can be connected to the delivery conduit 236. A second inlet of the pre-rinse unit 114 can be connected to the check valve 280. The check valve 280 and/or the fresh water supply assembly 210 can be connected to a source of water, such as one or both of the hot and cold water faucets 122, 124. In some configurations, because the pre-rinse unit 114 is disconnected from the public water supply, any low-flow nozzle can be removed and a high-flow (or normal flow) nozzle can be installed in the place of the low-flow nozzle. The outlet conduit 202 of the water level control assembly 200 can be positioned over a floor sink or floor drain. The pump 230 can be connected to an electrical supply. With these very few connections made, the tank 156 can be primed using the fresh water supply assembly 210 and then operations can commence using the gray water captured from the warewashing machine 104 beginning with the second cycle. The selector 280 can be adjusted to vary the amount (e.g., relative percentages) of gray water and fresh water dispensed from the pre-rinse unit 114. In some embodiments, the selector 280 can be adjusted to provide a blend of gray water and fresh water.

At the end of operations (e.g., the end of the work day), the contents of the tank 156 can be drained through the pre-rinse unit 114 and/or the spigot 226. Once drained, the auxiliary device 150 can be moved out from beneath the warewashing station 100 to allow cleaning beneath that warewashing station 100. In addition, the fine scrap trap 172 can be removed from the opening 174. The opening 174 advantageously can be sized and configured to allow an operator to reach inside of the tank 156 to dry and clean the inside of the tank 156. Moreover, the opening 174 can be configured to allow visual confirmation that the tank 156 has been cleaned and dried.

In some embodiments, a method of installation includes disconnecting the inlet of the pre-rinse unit 314 from hot and/or cold water conduits 322, 324. In some installations, the pre-rinse unit 314 can remain connected to the hot and/or cold water conduits 322, 324. In some implementations, the method includes providing the pre-rinse unit 314 with a second output, such as a spray nozzle 325. In some embodiments, the method includes maintaining flows of potable fresh water and gray water separate (e.g., not mixed until after being dispensed from respective nozzles). In some configurations, because the spray nozzle 325 is not connected from the public water supply, any low-flow nozzle can be removed and a high-flow (or normal flow) nozzle can be installed in the place of the low-flow nozzle. A foot pedal can be installed to control the flow out of the nozzle. The foot pedal can be positioned on or near the floor. The foot pedal can be positioned in a place convenient for the user to access while using the pre-rinse station.

The auxiliary device 350 can be moved into position proximate the warewashing station. The auxiliary device 350 can be located such that the drain outlet 334 from the warewashing machine empties into the inlet 374 into the tank 356 (e.g., empties into the screen 372). In some embodiments, a delivery conduit can be provided to transport the flow from the outlet 334 to the inlet 374 and into the tank 356.

The overflow outlet 404 can be positioned over a floor sink or floor drain. The pump 430 can be connected to an electrical supply. As mentioned above, the pump 430 can be a dry pump, which can eliminate the need to add liquid into the tank 356 to prime the pump. The treatment agent container 408 can be connected to the valve 406, such as with a flexible or rigid tube. The selector 418 can be adjusted to vary the amount (e.g., mL/min) of treatment agent dispensed from the treatment agent container 408. In some embodiments, the method includes positioning the treatment agent container 408 underneath the tank 356.

Operations can commence using the gray water captured from the warewashing machine. In some implementations, using the gray water begins with the second cycle of the warewashing machine, since some warewashing machines will not dispense gray water into the tank 356 until after the first cycle. In various embodiments, the gray water can be dispensed from the warewashing machine into the tank 356. When the nozzle 325 is activated (e.g., opened), the gray water flow out of the outlet 422, through the valve 406, and to the nozzle 325. As previously discussed, the gray water can be mixed with the treatment agent at or near the valve 406.

At the end of operations (e.g., the end of the work day), the contents of the tank 356 can be drained through the pre-rinse unit 314 and/or the drain outlet 424. Once drained, the auxiliary device 350 can be moved out from beneath the warewashing station to allow cleaning beneath that warewashing station. The auxiliary device 350 need not be moved since it can have a continuous bottom surface that is easier to clean under. The screen 372 can be removed from the opening 374. The opening 374 advantageously can be sized and configured to allow an operator to reach inside of the tank 356 to dry and clean the inside of the tank 356. Moreover, the opening 374 can be configured to allow visual confirmation that the tank 356 has been cleaned and dried. The illustrated configuration in FIG. 9 has a large opening that is larger than the screen 372, which can ease cleaning and visual confirmation.

The methods described above can be implemented using either the auxiliary device 150 or the auxiliary device 350. In use, the auxiliary device can save water as well as gas and/or electricity. First, by capturing the gray water from the commercial warewashing machine, the auxiliary device significantly decreases the amount of water used in the warewashing process. In addition, because fresh water is not being used by the pre-rinse station, the fresh water need not be heated, which saves gas and/or electricity that would be used to heat the fresh water supply. Because the gray water has a sufficiently elevated temperature for pre-rinsing, the gray water does not require further heating. The savings for a commercial food service facility can easily exceed $55,000 per year.

Certain Terminology

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees and the term "generally perpendicular" can refer to something that departs from exactly perpendicular by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Summary

Although certain gray water source devices and methods have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of the invention. The scope of this disclosure should not be limited by the particular disclosed embodiments described herein. Various components may be repositioned as desired. Moreover, not all of the features, aspects and advantages are necessarily required to practice the present invention.

Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be described and/or depicted in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of receptacle assemblies have been disclosed. Although the receptacle assemblies have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described above, but should be determined only by a fair reading of the claims that follow.

The following is claimed:

1. A method of installing a gray water system for water-efficient rinsing of dishes, the method comprising:
   obtaining the gray water system, the gray water system comprising:
      a gray water tank comprising an inlet and an outlet, the gray water tank configured to contain a volume of gray water; and
      an electric pump;
   positioning the gray water tank under a commercial warewashing machine and such that the gray water tank is separate from the warewashing machine;
   fluidly connecting the gray water tank and the warewashing machine such that gray water discharged from the warewashing machine passes through an air gap between the gray water tank and the warewashing machine and into the inlet of the gray water tank with no physical components interposed therebetween, wherein the grey water does not mix with fresh water in the grey water tank.

2. The method of claim 1, further comprising:
   installing a nozzle at a pre-rinse station that is separate from the warewashing machine; and
   fluidly connecting the nozzle to the electric pump such that the gray water can be pumped from the gray water tank to the nozzle and dispensed outside of the warewashing machine and the grey water tank.

3. The method of claim 2, further comprising installing a foot pedal that actuates a valve to control flow from the nozzle.

4. The method of claim 1, further comprising positioning a scrap trap in the inlet.

5. The method of claim 1, wherein the gray water tank receives the gray water directly from the warewashing machine.

6. The method of claim 1, further comprising installing a delivery conduit that transports gray water partly between the warewashing machine and the gray water tank.

7. The method of claim 1, wherein the installation is performed without significant modification to the warewashing machine.

8. The method of claim 1, further comprising elevating the gray water tank above a floor.

9. The method of claim 1, wherein positioning the gray water tank under the warewashing machine comprises positioning the gray water tank directly under the warewashing machine.

10. The method of claim 1, further comprising positioning the electric pump under the warewashing machine.

11. A water-efficient method of cleaning dishes in a kitchen, the method comprising:
   (1) receiving soiled dishes;
   (2) rinsing the soiled dishes with gray water from a gray water tank;
   (3) loading the rinsed dishes into a commercial warewashing machine;
   (4) operating the warewashing machine to clean the loaded dishes;
   (5) discharging gray water out of the warewashing machine;
   (6) passing the gray water through an air gap with no physical components interposed therebetween;
   (7) receiving the gray water through an inlet in the gray water tank;
   (8) collecting the gray water in the gray water tank, wherein the grey water collected in the grey water tank is not the grey water used to rinse the soiled dishes in step (2); and
   (9) repeating steps (1)-(8).

12. The method of claim 11, wherein rinsing the soiled dishes further comprises pumping, with an electric pump, gray water out of the gray water tank.

13. The method of claim 12, wherein rinsing the soiled dishes further comprises operating a nozzle at a pre-rinse station that is separate from the warewashing machine.

14. The method of claim 13, wherein rinsing the soiled dishes further comprises operating a foot pedal to actuate a valve to control flow from the nozzle.

15. The method of claim 11, wherein receiving the gray water through an inlet in the gray water tank further comprises passing the gray water through a scrap trap.

16. The method of claim 13, further comprising discharging potable fresh water from a second nozzle at the pre-rinse station, and maintaining the potable fresh water separate from the gray water at the pre-rinse station until after dispensation from the respective nozzle or second nozzle.

* * * * *